United States Patent
Lee et al.

(10) Patent No.: US 11,487,452 B2
(45) Date of Patent: Nov. 1, 2022

(54) ELECTRONIC DEVICE AND METHOD FOR UTILIZING MEMORY SPACE THEREOF

(71) Applicant: SAMSUNG ELECTRONICS CO., LTD., Suwon-si (KR)

(72) Inventors: Changheun Lee, Suwon-si (KR); Sungdo Moon, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/802,903

(22) Filed: Feb. 27, 2020

(65) Prior Publication Data

US 2020/0285407 A1  Sep. 10, 2020

(30) Foreign Application Priority Data

Mar. 7, 2019 (KR) .................. 10-2019-0026254
Jun. 14, 2019 (KR) .................. 10-2019-0070430

(51) Int. Cl.
 *G06F 3/06* (2006.01)
 *G06F 9/50* (2006.01)

(52) U.S. Cl.
 CPC .......... *G06F 3/0634* (2013.01); *G06F 3/0613* (2013.01); *G06F 3/0631* (2013.01);
 (Continued)

(58) Field of Classification Search
 CPC .... G06F 9/5022; G06F 9/5016; G06F 3/0631; G06F 3/0673; G06F 3/0634
 See application file for complete search history.

(56) References Cited

U.S. PATENT DOCUMENTS 5,784,646 A    7/1998  Sawada
5,893,920 A *  4/1999  Shaheen ............... G06F 12/121
                                                 711/133

(Continued)

FOREIGN PATENT DOCUMENTS

KR  10-2010-0107470   10/2010
KR  10-2012-0013679    2/2012

(Continued)

OTHER PUBLICATIONS

International Search Report and Written Opinion dated Jun. 11, 2020 in counterpart International Patent Application No. PCT/KR2020/002762.

(Continued)

*Primary Examiner* — Edward J Dudek, Jr.
(74) *Attorney, Agent, or Firm* — Nixon & Vanderhye P.C.

(57) ABSTRACT

In various embodiments, an electronic device may include a display, a memory including a first space storing no data and a second space storing data, and a processor. The processor may be configured to control the electronic device to: receive an input for inputting a setting value for a fast data storage mode of the memory, to allocate a predetermined size of a free space of a file system of the electronic device as a temporary memory space for the fast data storage mode based on the setting value for the fast data storage mode, to control the memory to allocate a predetermined size of the first space as a borrowed space for the fast data storage mode corresponding to the size of the temporary memory space, to recognize occurrence of an event for starting data storage through the fast data storage mode, and to control the memory to perform the data storage using the borrowed space through the fast data storage mode in response to the occurrence of the event.

20 Claims, 18 Drawing Sheets

(52) U.S. Cl.
CPC .......... *G06F 3/0652* (2013.01); *G06F 3/0653* (2013.01); *G06F 3/0673* (2013.01); *G06F 9/5016* (2013.01); *G06F 9/5022* (2013.01)

(56) References Cited

U.S. PATENT DOCUMENTS

| | | |
|---|---|---|
| 9,026,737 B1 | 5/2015 | Armangau et al. |
| 9,928,169 B2 | 3/2018 | Romanovsky et al. |
| 10,120,794 B2 | 11/2018 | Shin |
| 2008/0027905 A1 | 1/2008 | Jensen et al. |
| 2008/0112238 A1 | 5/2008 | Kim et al. |
| 2013/0046920 A1 | 2/2013 | Ryu et al. |
| 2014/0201423 A1 | 7/2014 | Jean et al. |
| 2017/0092366 A1* | 3/2017 | Hwang ................ G06F 3/0679 |
| 2019/0065080 A1* | 2/2019 | Tanpairoj ............... G06F 3/061 |

FOREIGN PATENT DOCUMENTS

| | | |
|---|---|---|
| KR | 10-2016-0087426 | 7/2016 |
| WO | 2014/110535 | 7/2014 |

OTHER PUBLICATIONS

Extended Search Report and Written Opinion dated Jul. 31, 2020 in counterpart European Patent Application 20161485.6.

\* cited by examiner

ELECTRONIC DEVICE AND METHOD FOR UTILIZING MEMORY SPACE THEREOF

CROSS-REFFERENCE TO RELATED APPLICATIONS

This application is based on and claims priority under 35 U.S.C. § 119 to Korean Patent Application No. 10-2019-0026254, filed on Mar. 7, 2019, and Korean Patent Application No. 10-2019-0070430, filed on Jun. 14, 2019, in the Korean Intellectual Property Office, the disclosures of which are incorporated by reference herein in their entireties.

BACKGROUND

Field

The disclosure relates to an electronic device and a method for utilizing a memory space thereof. For example, the disclosure relates to an electronic device and method for performing a fast data storage mode of a memory through a file system.

Description of Related Art

Normally, an electronic device such as a portable terminal device may have a memory that uses a mode of storing data with a high density in order to store a large amount of data.

Using the high-density data storage mode when storing data in a memory of the electronic device allows storing a larger amount of data than using a low-density data storage mode. However, a data storage speed may be sacrificed.

With the growth of high-speed data transfer technology, a technique to rapidly store received data in a memory is also studied and developed.

In order to increase the data storage speed of the memory, the memory may use a fast data storage mode in which data is temporarily stored in a portion of a memory space through a low-density data storage mode and then stored again through a high-density data storage mode, for example, in a background process. In this case, the memory allocates a certain size of the memory space for temporarily storing data, but a processor of the electronic device has a difficulty in identifying the allocated size of the memory space.

Therefore, while the memory of the electronic device uses the above fast data storage mode, the processor may generate a write I/O request for storing data even in the portion allocated as the temporary memory space where data has been temporarily stored. As a result, the memory has to return the temporary memory space to an empty space, so that a data processing time may be delayed.

In addition, when the electronic device continuously activates and uses the fast data storage mode of the memory, the memory space may be unnecessarily wasted and the life of the memory may be reduced.

SUMMARY

Embodiments of the disclosure provide a method and device addressing the above deficiencies by allowing a user to set and manage, through a file system, a size of a space temporarily allocated for a fast data storage mode in a memory space of a memory, and to efficiently use the fast data storage mode of the memory by determining a time point to activate/deactivate the fast data storage mode.

According to various example embodiments of the disclosure, an electronic device may include a display, a memory including a first space configured to store no data and a second space configured to store data, and a processor. The processor may be configured to control the electronic device to: receive an input for inputting a setting value for a fast data storage mode of the memory, to allocate a predetermined size of a free space of a file system of the electronic device as a temporary memory space for the fast data storage mode based on the setting value for the fast data storage mode, to control the memory to allocate a predetermined size of the first space as a borrowed space for the fast data storage mode corresponding to the size of the temporary memory space, to recognize occurrence of an event for starting data storage through the fast data storage mode, and to control the memory to perform the data storage using the borrowed space through the fast data storage mode in response to the occurrence of the event.

According to various example embodiments of the disclosure, a method for utilizing a memory space of an electronic device may include: receiving an input for inputting a setting value for a fast data storage mode of a memory; allocating a predetermined size of a free space of a file system of the electronic device as a temporary memory space for the fast data storage mode based on the setting value for the fast data storage mode; allocating a predetermined size of a first space of the memory configured to store no data as a borrowed space for the fast data storage mode corresponding to the size of the temporary memory space; recognizing occurrence of an event for starting data storage through the fast data storage mode; and performing the data storage using the borrowed space through the fast data storage mode at the memory in response to the occurrence of the event.

According to various example embodiments of the disclosure, an electronic device may allow a user to set and manage, through a file system, a size of a space temporarily allocated for a fast data storage mode in a memory space of a memory. This prevents and/or reduces overlap between an internal data I/O request of the memory and a user's data I/O request via the file system, thus reducing data processing delay and performance degradation.

In addition, the electronic device may efficiently use the fast data storage mode of the memory by determining a time point to activate/deactivate the fast data storage mode.

BRIEF DESCRIPTION OF THE DRAWINGS

The above and other aspects, features and advantages of certain embodiments of the present disclosure will be more apparent from the following detailed description, taken in conjunction with the accompanying drawings.

DETAILED DESCRIPTION

Hereinafter, various example embodiments of the disclosure will be described in greater detail with reference to accompanying drawings.

Figure 1:
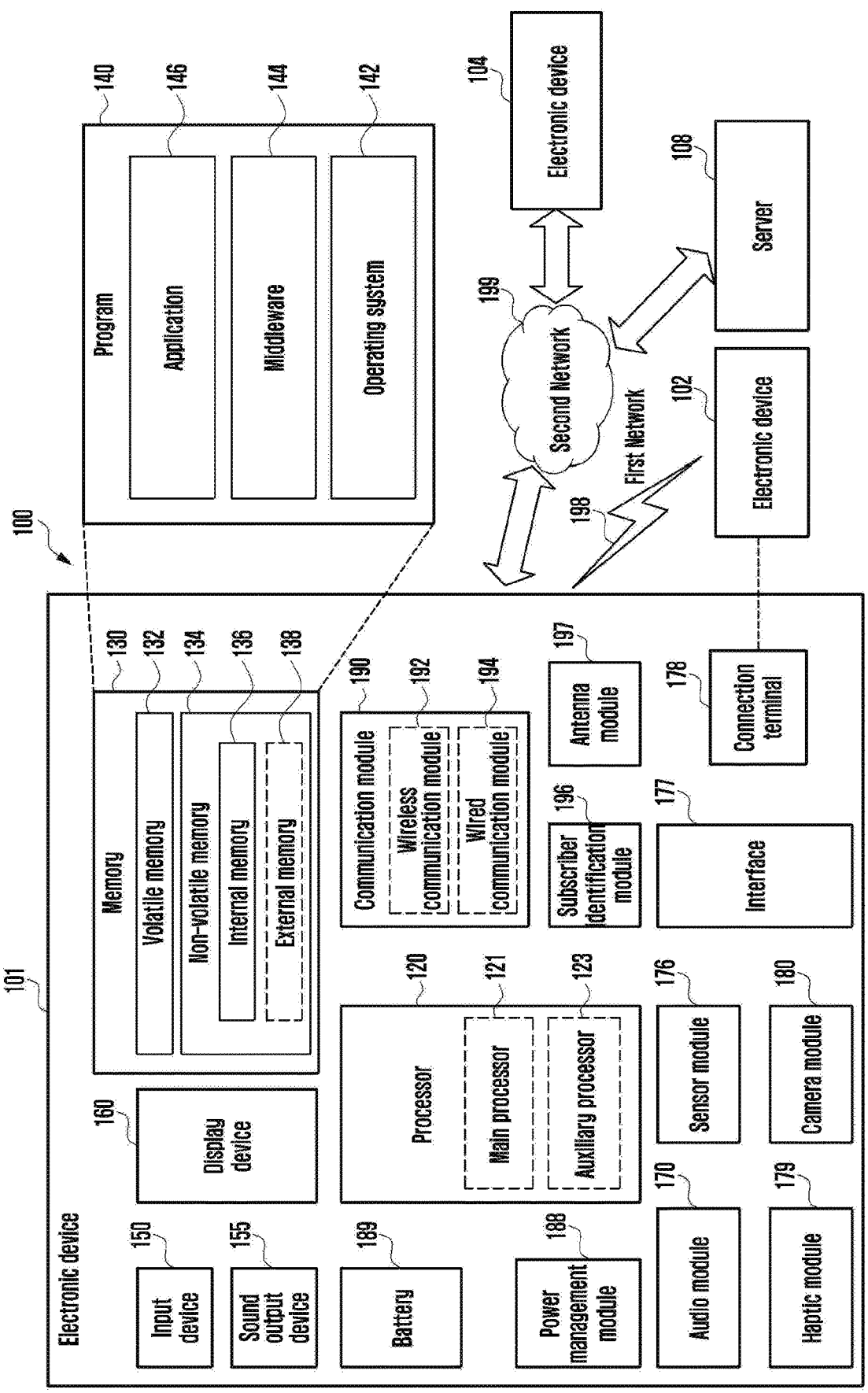
FIG. 1 is a block diagram illustrating an example electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2A:
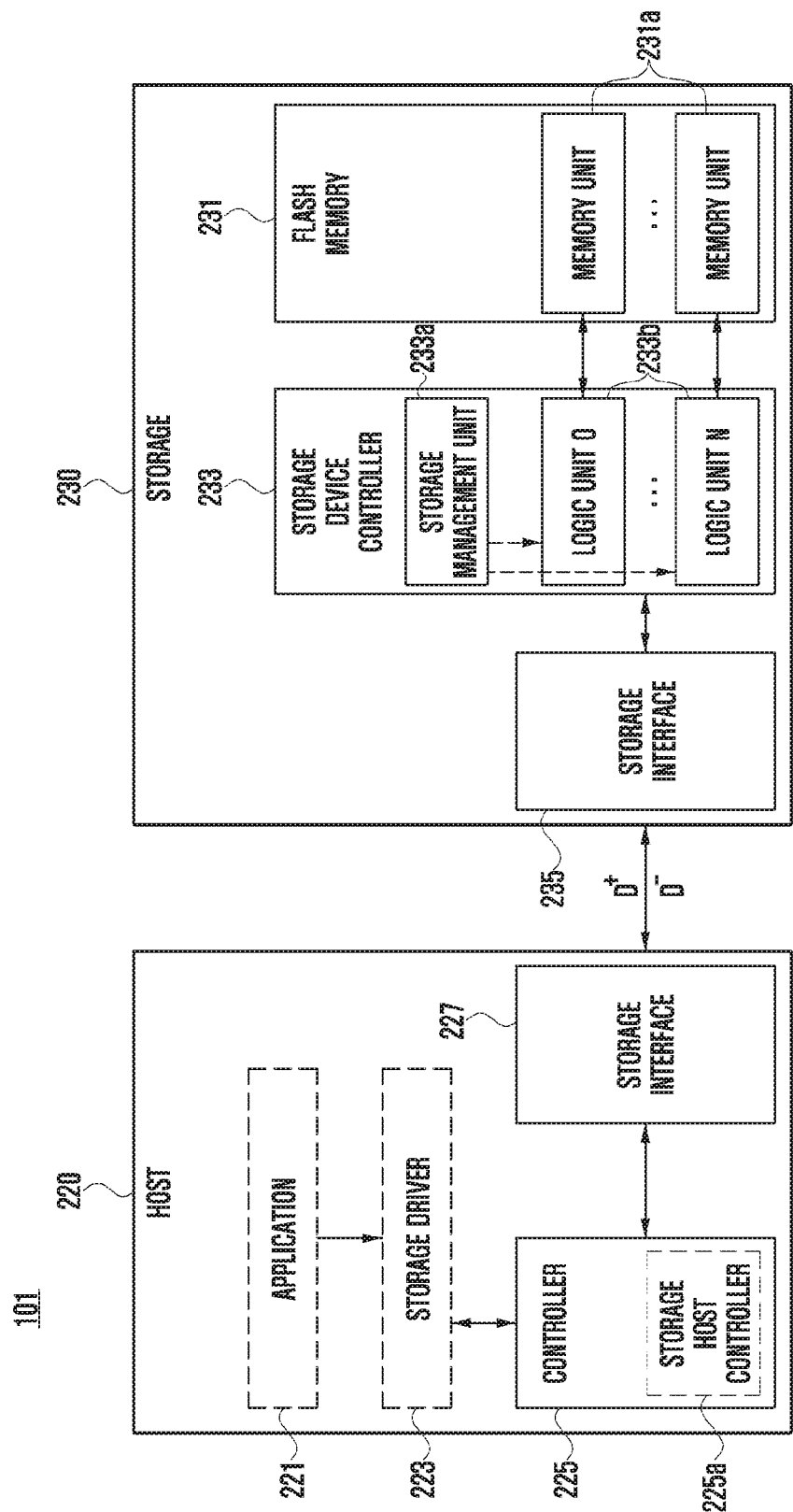
FIGS. 2A, 2B and 2C are block diagrams illustrating example hardware/software architectures of an electronic device according to various embodiments.
Figure 2B:
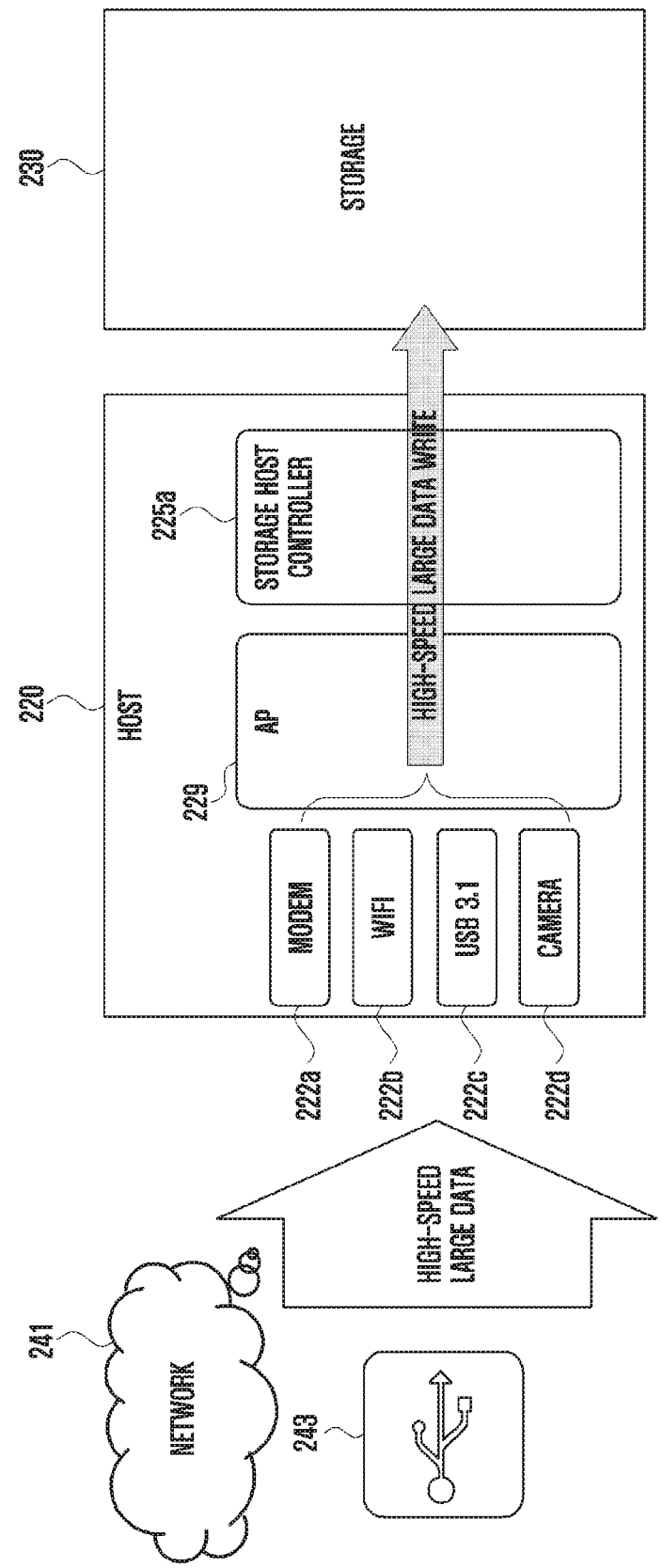
Figure 2C:
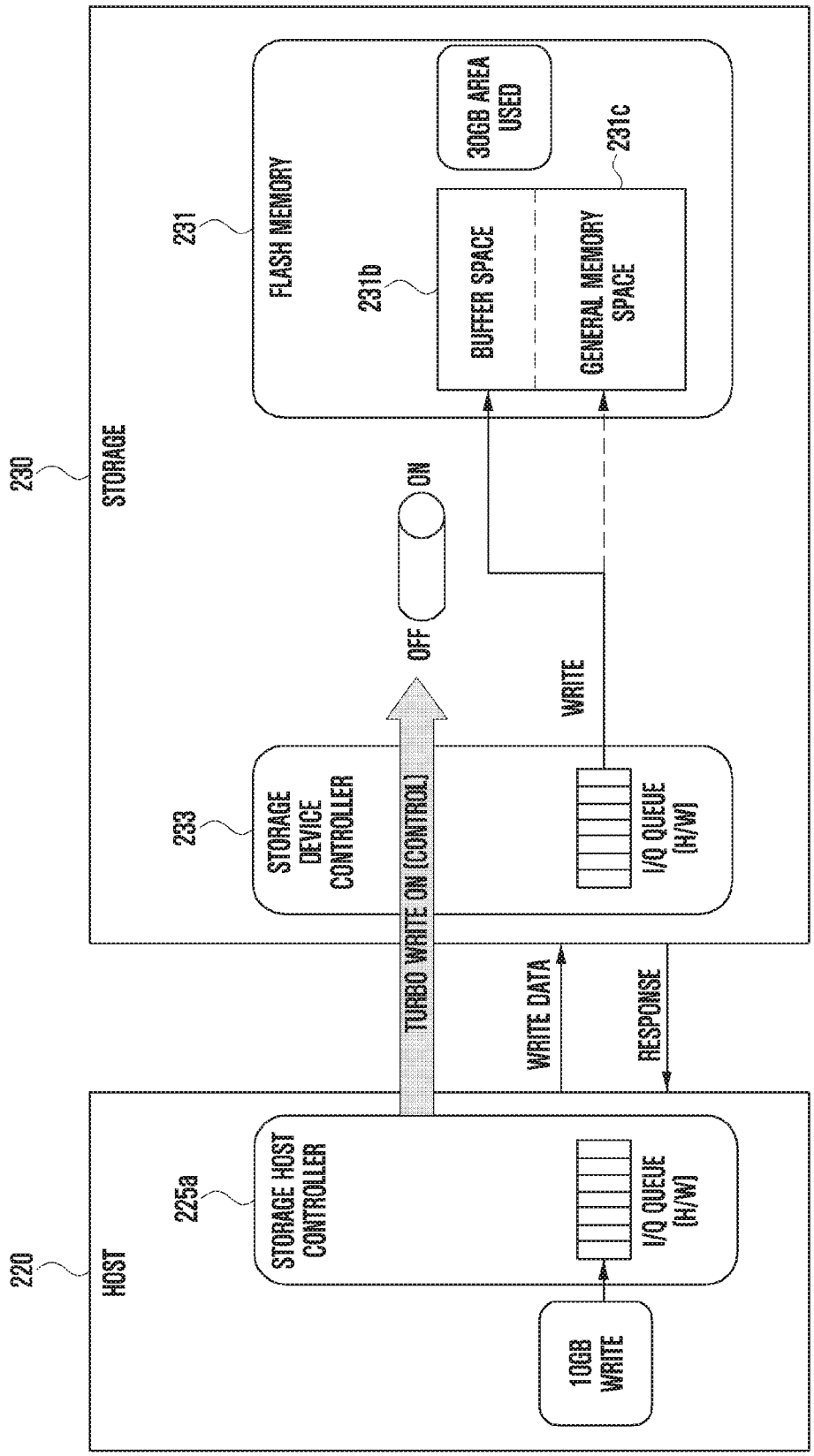

FIGS. 2A, 2B and 2C are block diagrams illustrating example hardware/software architectures of an example electronic device according to various embodiments.

Referring first to FIG. 2A, an electronic device 101 according to various embodiments may include a host 220 and a storage 230 (e.g., the memory 130 in FIG. 1). Some of the components shown in FIG. 2A may be omitted or substituted. According to various embodiments, the electronic device 101 may include a display (not shown, e.g., the display device 160 in FIG. 1), a battery (not shown, e.g., the battery 189 in FIG. 1), and/or a power management module (not shown, e.g., the power management module 188 in FIG. 1). According to various embodiments, the electronic device 101 may further include at least one of a camera (e.g., the camera module 180 in FIG. 1), an LCD (e.g., the display device 160 in FIG. 1), a speaker (e.g., the sound output device in FIG. 1), a touch screen (e.g., the display device 160 in FIG. 1), a communication circuit (e.g., the communication module 190 in FIG. 1), and/or a USB (e.g., the connecting terminal 178 in FIG. 1).

According to various embodiments, the host 220 may, for example, be an environment in which software including, for example, a user application and an operating system (OS) is running. The host 220 may transmit, to the storage 230, various data input/output (I/O) requests for data generated during a software operation. The host 220 may be, for example, a system on chip (SoC) including functions of a chipset that performs the operation and graphic processing of various applications of the electronic device 101. According to various embodiments, a configuration of controlling the storage 230 through an application processor (e.g., the processor 120 in FIG. 1) may, for example, be referred to as the host.

According to various embodiments, the host 220 may include an application processor (AP) (not shown, e.g., the processor 120 in FIG. 1) and control respective components of the electronic device 101 under the control of the application processor. According to various embodiments, the application processor may be configured to perform operations or data processing related to control and/or communication of respective components of the electronic device 101 and may include at least part of configuration and/or functionality of the processor 120 shown in FIG. 1. For example, the application processor may be operatively connected to components of the electronic device 101.

According to various embodiments, the host 220 may include an application 221, a storage driver 223, a controller (e.g., including processing circuitry) 225, and/or a storage interface (e.g., including interface circuitry) 227. The application 221 and the storage driver 223 indicated by dotted lines may, for example, be software programs, for example, contained in the application processor.

According to various embodiments, the controller 225 may, for example, include various processing and/or control circuitry that performs operations or data processing related to control and/or communication of respective components of the host 220. The controller 225 may include a controller that controls respective components of the electronic device 101. For example, the controller 225 may include a storage host controller 225a that controls the operation of the storage 230.

According to various embodiments, the controller 225 may transmit various control commands to the storage 230 through the storage interface 227 of the host 220. For example, the storage host controller 225a of the controller 225 may receive a data storing request from the application 221 through the storage driver 223 and, in response to the data storing request, transmit a data write I/O request to the storage 230 through the storage interface 227. According to various embodiments, the storage interface 227 of the host 220 may include various link-interfaces that provide a data link function. The storage interface 227 of the host 220 may include, for example, and without limitation, the MIPI M-PHY interface or the MIPI unipro interface defined in the MIPI alliance. The host 220 may perform high speed data communication with the storage 230 through, for example, the MIPI M-PHY interface or the MIPI unipro interface.

According to various embodiments, the display (not shown) may output various screens under the control of the processor. The display (not shown) may include, for example, a touch sensor panel (TSP) capable of recognizing contact or proximity (e.g., hovering) of various external objects. The touch sensor panel may have various structures and types, and the disclosure may be applied regardless of the structure and type of the touch sensor panel.

According to various embodiments, the storage 230 may store various kinds of data used by at least one component (e.g., the application processor) of the electronic device 101. Such data may include, for example, software (e.g., the program 140 in FIG. 1) and I/O data for a related command, but the disclosure is not limited thereto.

According to various embodiments, the storage 230 may include a flash memory 231, a storage device controller (e.g., including processing and/or control circuitry) 233, and/or a storage interface (e.g., including interface circuitry) 235.

According to various embodiments, the flash memory 231 may be, for example, a nonvolatile memory (e.g., the nonvolatile memory 134 in FIG. 1). The flash memory 231 may include, for example, a NAND flash memory 231 that meets a universal flash storage (UFS) standard. According to various embodiments, the storage device controller 233 may include various processing and/or control circuitry that performs operations or data processing related to control and/or communication of respective components of the storage 230. The storage device controller 233 may receive various control commands from the host 220 through the storage interface 235 of the storage 230. For example, the storage device controller 233 may receive data requests including, for example, and without limitation, a data write I/O request, a data read I/O request, or a data delete I/O request from the host 220 through the storage interface 235 of the storage 230. According to various embodiments, the storage interface 235 of the storage 230 may include various link-interfaces that provide a data link function. The storage interface 235 of the storage 230 may include, for example, and without limitation, the MIPI M-PHY interface or the MIPI unipro interface defined in the MIPI alliance.

According to various embodiments, a storage management unit 233a of the storage device controller 233 may include various storage management circuitry and configure and control at least one logical unit 233b. For example, the at least one logic unit 233b may store data in correspondence with at least one memory unit 231a of the flash memory 231.

According to various embodiments, the flash memory 231 of the storage 230 may use various data storage modes, depending on the number of data bits that can be stored in one cell. For example, a single-level cell (SLC) mode may store one bit of data per cell, a multi-level cell (MLC) mode may store two bits of data per cell, a triple-level cell (TLC) mode may store three bits of data per cell, and a quadruple-level cell (QLC) mode may store four bits of data per cell. Compared to storages using the SLC or MLC mode, the storage using the TLC or QLC mode may realize a relatively high-density data storage, but may sacrifice a data storing speed (or write speed).

According to various embodiments, the storage 230 may switch between two storage modes. For example, the storage 230 that stores data in the flash memory 231 in the TLC mode may temporarily switch the storage mode to the SLC mode in case of having to store data at a high speed. In the disclosure, this scheme will be referred to as "fast data storage mode".

According to various embodiments, the storage 230 using the TLC mode can improve a storage speed (or write speed) using the fast data storage mode. For example, the fast data storage mode may be a technique of temporarily storing data in the storage 230 through the SLC mode and thereafter internally storing again the data in the storage 230 through the TLC mode. In a process of temporarily storing data in accordance with the SLC mode, the storage 230 may allocate and use, as a borrowed space, a certain size of an empty space thereof (e.g., a space where no data is stored). The storage 230 may internally re-store the data therein in accordance with the TLC mode. This re-storing process may be, for example, a flush process (or migration process) of a UFS standard turbo write mode. In the re-storing process, the data temporarily stored in the borrowed space may be deleted to return the borrowed space as the empty space. For example, a certain size of the empty space of the storage 230 may be borrowed as a fast write buffer space for storing data temporarily in the SLC mode, and data transferred through the file system of the electronic device 101 may be stored temporarily in the fast write buffer space. The data stored in the fast write buffer space may be moved and stored again within the storage 230 by rewriting the data in the TLC mode. The rewriting process through the TLC mode may be an internal process of the storage 230 that may be unidentifiable through the file system, so that the user may simply feel that the storage speed becomes faster. According to various embodiments, the fast data storage mode may be, for example, a turbo write mode of the JEDEC standard UFS 3.1.

According to various embodiments, the application processor (e.g., the processor 120 in FIG. 1) of the host 220 may store data of a file form in the storage 230 through the file system of the electronic device 101. The file system may refer to, for example, a data structure managed by the application processor to store data in the storage 230. The electronic device 101 may utilize the file system to efficiently write data in the storage 230 or read data from the storage 230. For example, when storing data in the storage 230 through the file system, the application processor may transfer a memory write I/O request or a storage write I/O request to the storage 230. The file system may include, for example, and without limitation, file allocation table 16 (FAT16), file allocation table 32 (FAT32), new technology file system (NTFS), second extended file system (ext2), ext3, ext4, flash friendly file system (F2FS), or ReiserFS.

According to various embodiments, the communication circuit (not shown) may establish a communication channel with an external device and transmit/receive various data to/from the external device. In various embodiments, the communication circuit may be configured to include a cellular communication module to be connected to a cellular network (e.g., 3G LTE, 5G, Wibro, Wimax, etc.). In various embodiments, the communication circuit may include a short range communication module including various communication circuitry to transmit/receive data to/from an external device through short range communication (e.g., Wi-Fi, Bluetooth, Bluetooth Low Energy (BLE), UWB, etc.).

According to various embodiments, the connecting terminal (not shown) may include a connector physically connectable to an external device (e.g., a USB memory). In various embodiments, the connecting terminal may include, for example, and without limitation, an HDMI connector, a USB connector, an SD card connector, or an audio connector (e.g., a headphone connector). For example, the electronic device 101 may be connected to a USB memory complying with the USB 3.1 or USB 3.0 standard through the USB connector.

FIG. 2B is a block diagram illustrating an example electronic device according to various embodiments. FIG. 2B illustrates an example operation of an electronic device when a large amount of data is transmitted from the outside to the electronic device.

Referring to FIG. 2B, in various embodiments, the host 220 of the electronic device 101 may receive a large amount of data through a network 241, a connecting terminal 243, or a sensor (not shown). The high-speed large data may be provided to the AP 229 through a communication circuit (e.g., the 5G communication module 222a, the Wi-Fi communication module 222b), the connecting terminal (e.g., the USB 3.1 connecting terminal 222c), or the camera 222d of the host 220. When a large amount of data is received at a high speed from the outside, the application processor 229 (e.g., the processor 120 in FIG. 1) of the host 220 may have to rapidly store the large amount of data in the storage 230. Because the storage 230 may use a high-density data storage mode (e.g., TLC, QLC) to store a large amount of data, a technique to store data at a high speed while using the high-density data storage mode may be required. In order to increase the data storing speed of the storage 230, the storage 230 may use the above-described fast data storage mode that temporarily stores data in a portion of the memory space through a low-density data storage mode (e.g., SLC) and then stores again the data through a high-density data storage mode (e.g., MLC, TLC, or QLC). The fast data storage mode may be, for example, a turbo write mode of the JEDEC standard UFS 3.1.

FIG. 2C is a block diagram illustrating an example electronic device according to various embodiments. FIG. 2C shows a mode of storing data by activating a fast data storage mode (or function) of a storage of an electronic device.

Referring to FIG. 2C, in various embodiments, the host 220 may activate (ON) or deactivate (OFF) the fast data storage mode under the control of the application processor 229 (e.g., the processor 120 in FIG. 1). The application processor 229 may transmit a control command to the storage 230 to cause the storage 230 to store data through the fast data storage mode (e.g., the turbo write mode). In an embodiment, the application processor 229 may determine whether a specific event predefined to start storing data through the fast data storage mode occurs, and transmit the above control command to the storage 230 in response to the occurrence of the predefined event.

According to various embodiments, in the storage 230, the memory space (e.g., the memory unit 231a in FIG. 2A) of the flash memory 231 may include a buffer space 231b and a general memory space 231c. The buffer space 231b may be a borrowed space allocated for storing data at a high speed through the SLC mode. The general memory space 231c may be a memory space for storing data through the TLC (or MLC or QLC) mode. The buffer space 231b may be a space that borrows a portion of an empty space of the general memory space 231c of the storage 230 for the fast data storage mode, and thus may not be a fixed memory space. According to various embodiments, in case of need, the storage 230 may allocate a certain space having a predetermined size in the empty space of the general memory space 231c as a borrowed space for the fast data storage mode. In various embodiments, when the fast data storage mode is not used, the storage 230 may return the allocated buffer space 231b to the general memory space 231c.

According to various embodiments, when a control command for performing data storage through the fast data storage mode is received from the application processor 229 of the host 220, the storage 230 may allocate a portion of the memory space of the flash memory as the buffer space 231b for the fast data storage mode.

According to various embodiments, the size of the buffer space 231b of the storage 230 may be determined, based on a setting value for the fast data storage mode set, for example, by the user. In an embodiment, the flash memory 231 of the storage 230 may store data in the general memory space through the TLC mode and also store data in the buffer space through the SLC mode which is the fast data storage mode. For example, when there occurs a data write request having a size of 10 GB, the storage 230 may allocate the buffer space 231b as a size of 30 GB. Such data storage modes and data sizes are examples only, and any other mode and size may be applied.

FIGS. 3A, 3B, 3C and 3D are diagrams illustrating examples of sizes of memory spaces of a storage identified through a file system and sizes of actual memory spaces inside the storage according to various embodiments.

Figure 3A:
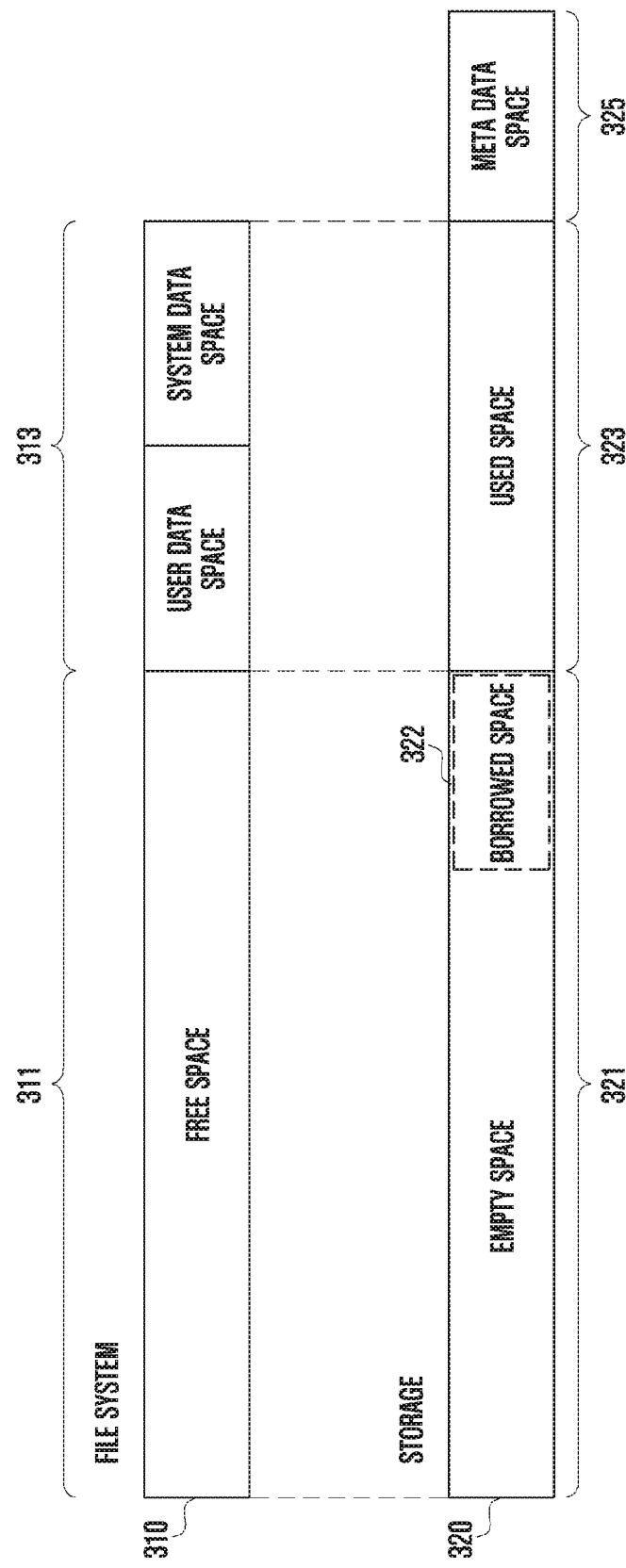
FIGS. 3A, 3B, 3C and 3D are diagrams illustrating example sizes of memory spaces of a storage identified through a file system and sizes of actual memory spaces inside the storage according to various embodiments.
Figure 3B:
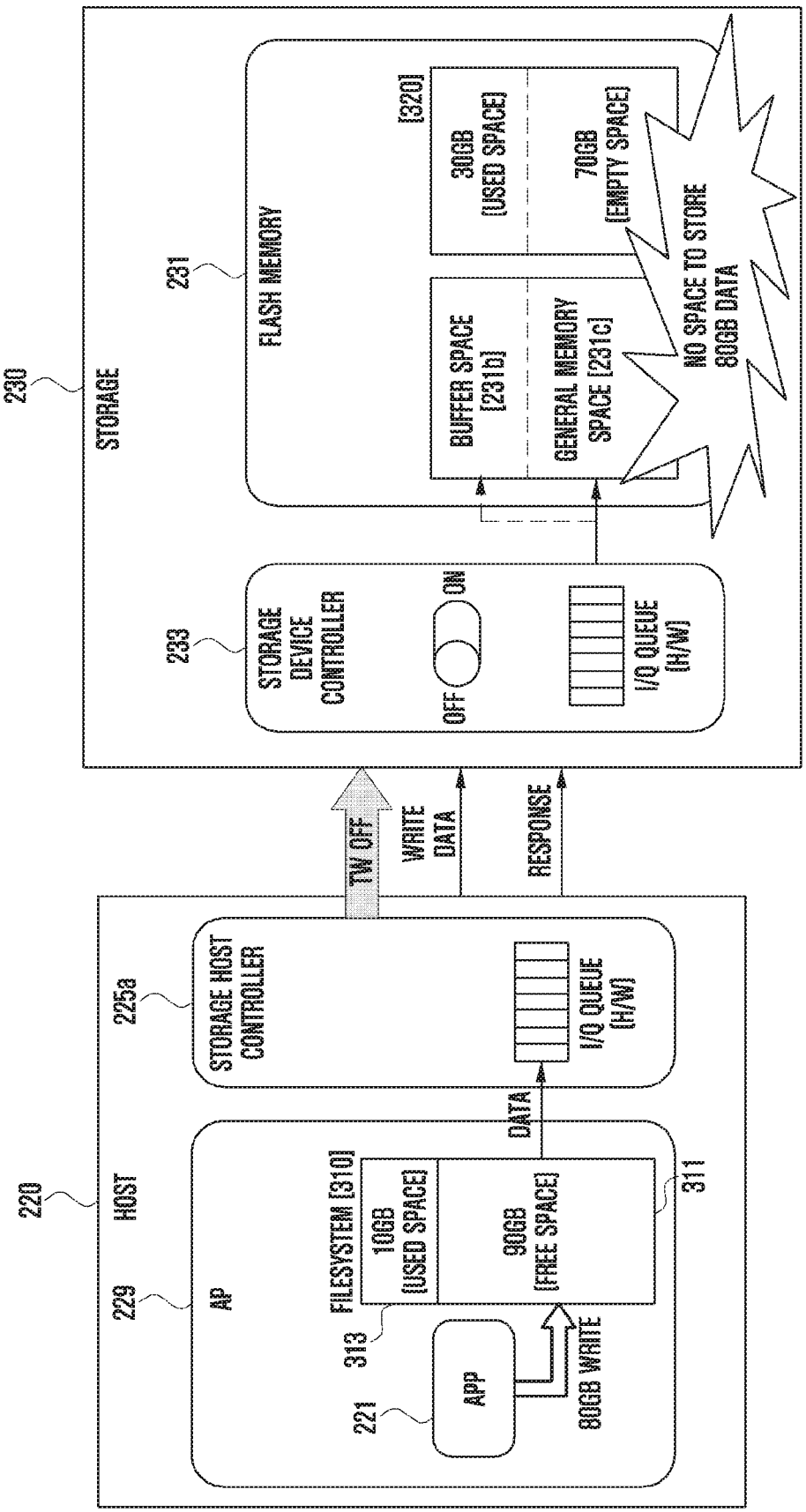

For example, in FIGS. 3A and 3B, reference numeral 310 indicates the sizes of memory spaces of the storage 230 identified through the file system when the fast data storage mode is performed, and reference numeral 320 indicates the sizes of actual memory spaces inside the storage 230.

Referring to FIGS. 3A and 3B, in various embodiments, the application processor 229 (e.g., the processor 120 in FIG. 1) may identify and manage memory spaces of the storage 230 (e.g., the nonvolatile memory 134 in FIG. 1) through the file system. The application processor 229 may store data in the storage 230 through the file system. The memory spaces of the storage 230 identified through the file system (hereinafter, referred to as the memory spaces of the file system) may include a free space 311 (hereinafter, referred to as the free space of the file system) in which data is not stored yet, and a space 313 in which data is stored. The data stored space 313 may include, for example, a user data space (hereinafter, referred to as the user data space of the file system) in which user data is stored, and a system data space (hereinafter, referred to as the system data space of the file system) in which system data is stored.

According to various embodiments, the memory space inside the storage 230 may include an empty space 321 in which no data is stored, a used space 323 in which data is stored by the application processor 229, and a metadata space 325 in which metadata used by the storage 230 itself is stored. The empty space 321, the used space 323, and the metadata space 325 are, for example, spaces for storing data through a predetermined storage mode (e.g., TLC) and may be the general memory space 231c shown in FIG. 2C. The metadata space 325 may be a hidden space that is not identified by the file system. The free space 311 of the file system may correspond to the empty space 321 of the storage 230, and the user data space and system data space of the file system may correspond to the used space 323 of the storage 230.

According to various embodiments, when a data write input/output request (i.e., storage write I/O or memory write I/O) for storing data in the free space 311 of the file system is received, the application processor 229 may control the storage 230 to store data in the empty space 321.

According to various embodiments, in order to perform data storage through the fast data storage mode, the storage 230 may allocate a predetermined size of the empty space 321 as a borrowed space 322 (e.g., the buffer space 231b in FIG. 2C) and use it as a temporary space for the fast data storage mode. For example, when the size of the empty space 321 of the storage 230 is 40 GB in total, 3 GB of the empty space may be allocated as the borrowed space 322 for the fast data storage mode. The size allocated for the fast data storage mode may be arbitrarily predetermined. In some embodiments, when the fast data storage mode of the storage 230 is a turbo write function of the UFS, the storage 230 may temporarily store data in the borrowed space 322 having the predetermined size through the SLC mode, then rewrite the data stored in the borrowed space 322 into the empty space excluding the borrowed space 322 of the storage 230 through the TLC mode (or MLC mode), and return the borrowed space 322 to the empty space 321. In an example embodiment, the storage 230 may allocate a predetermined size of the metadata space 325 as the borrowed space 322 for the fast data storage mode.

According to various embodiments, because an operation related to the fast data storage mode is an internal operation of the storage 230, the application processor 229 may be incapable of identifying, through the file system, information (e.g., size) about the borrowed space 322 allocated for the fast data storage mode in the storage 230. According to embodiments, in case of failing to identify information about the borrowed space 322, the application processor 229 may send a data write I/O request for storing additional data even in the borrowed space 322 being used by the storage 230 for the fast data storage mode. In response to the request, the storage 230 may have to delete data temporarily stored in the borrowed space 322 and return the borrowed space 322 to the empty space 321.

FIG. 3B is a diagram illustrating an example where the file system cannot identify the size of the borrowed space 322 allocated for the fast data storage mode. In this case, it is assumed that the general storage space 231c of the flash memory 231 stores data through the TLC mode, and the buffer space 231b stores data through the SLC mode. In this case, through the file system 310, the application processor 229 may identify that the memory space of the storage 230 is 100 GB in total and 10 GB is used. That is, the application processor 229 may identify, through the file system 310, that the size of the free space 311 is 90 GB and the size of the used space 313 is 10 GB.

When the fast data storage function is activated, the storage 230 that will store 10 GB data through the fast data storage mode may allocate 30 GB of the 100 GB memory space of the flash memory 231 as the buffer space 231b (e.g., the borrowed space 322 in FIG. 3A) for the SLC mode. That is, data that uses a 10 GB space in the TLC mode will use a 30 GB space in the SLC mode. In this case, a difference may occur between the free space 311 recognized by the application processor 229 of the host 220 and the empty space 321a of the flash memory 231 of the actual storage 230.

Because the size of the free space 311 identified by the application processor 229 through the file system is 90 GB, an additional request for writing data of a 80 GB size, for example, may occur. In this case, an actual empty space of the general memory space 231c of the flash memory 231 is merely 70 GB, which is insufficient to store the 80 GB data. As a result, the application processor 229 of the host 220 may have to deactivate the fast data storage mode of the storage 230 to return the buffer space 231b of the flash memory 231 to the general memory space 231c. The above-described data storage modes and data sizes are examples only, and any other mode and size may be applied.

Figure 3C:
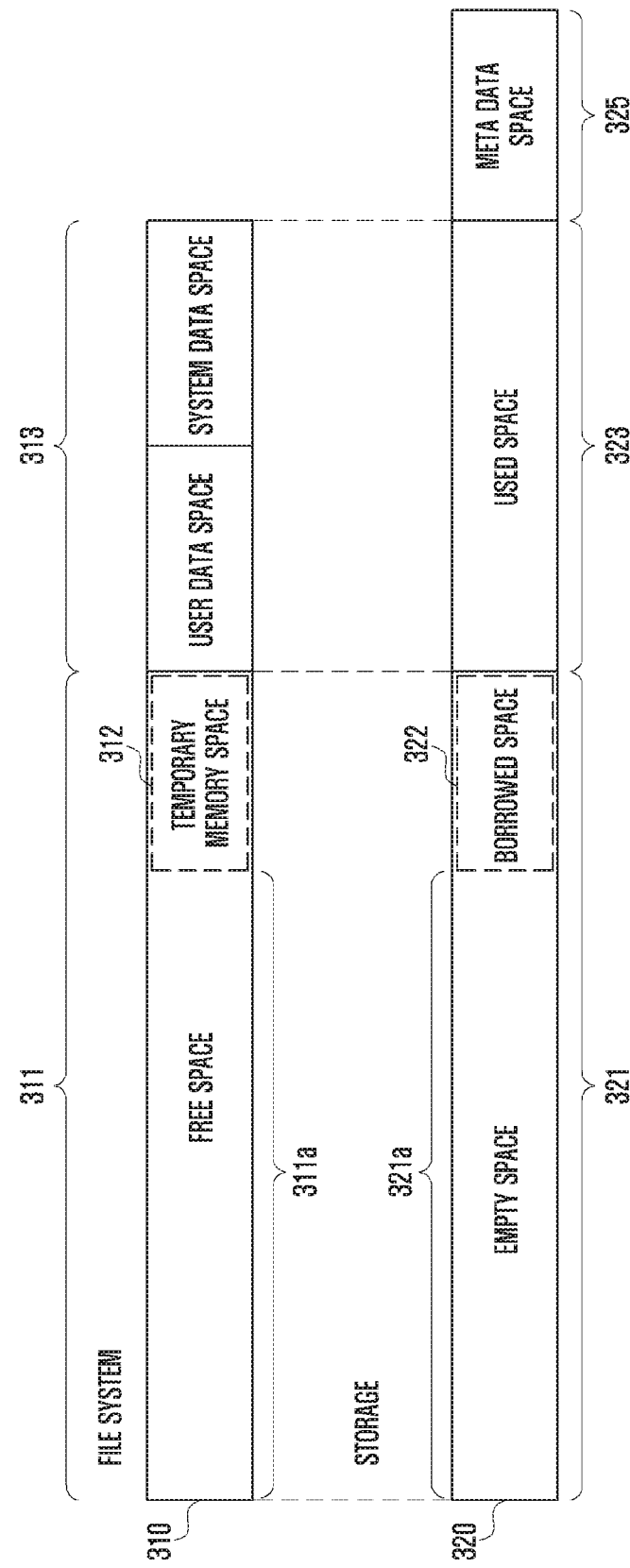
Figure 3D:
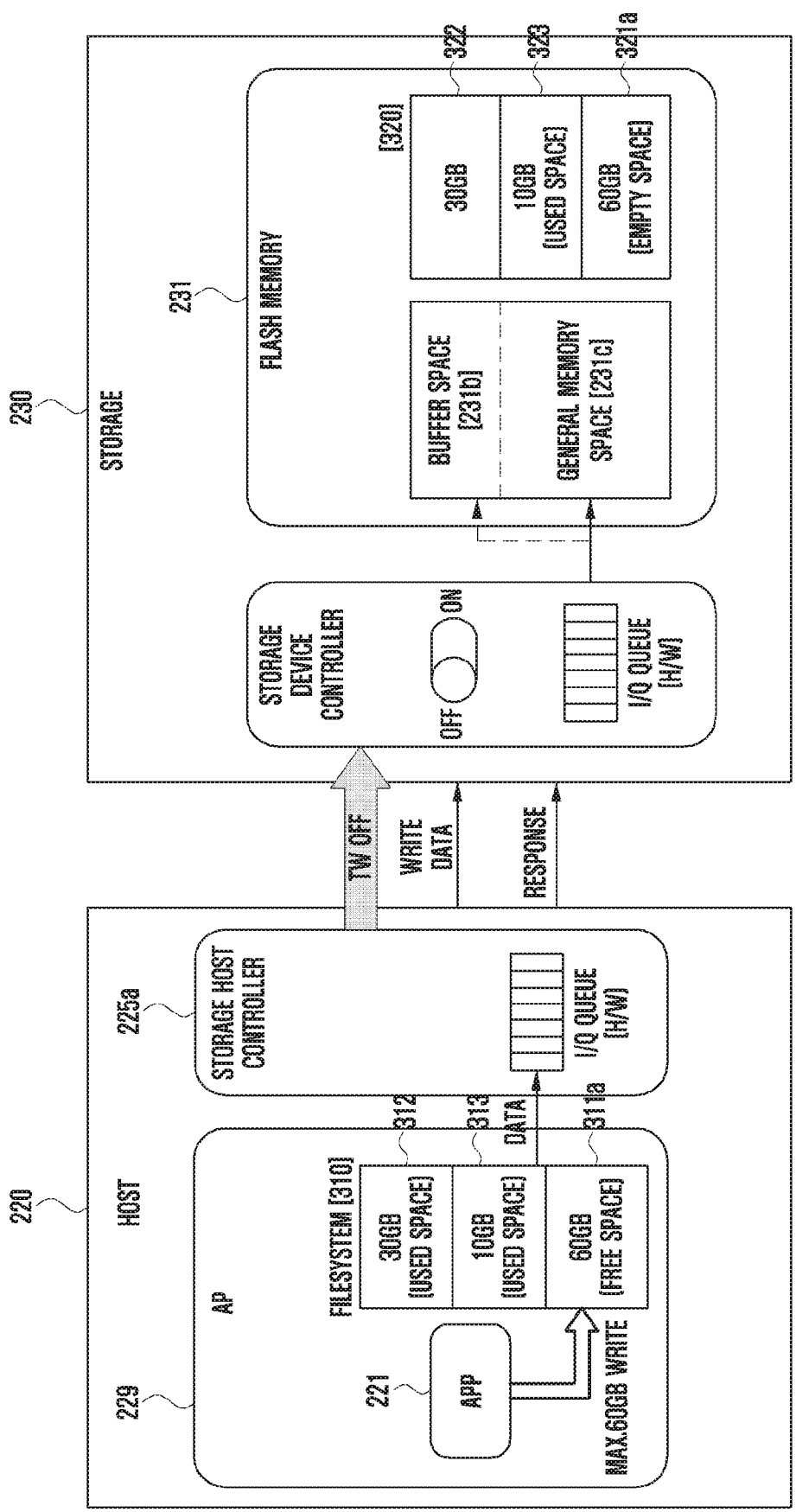

Meanwhile, in FIGS. 3C and 3D, reference numeral 310 indicates the sizes of memory spaces of the storage 230 identified through the file system when the fast data storage mode is performed, and reference numeral 320 indicates the sizes of actual memory spaces inside the storage 230. The same descriptions as those of FIGS. 3A and 3B will be omitted.

Referring to FIGS. 3C and 3D, in various embodiments, the application processor 229 (e.g., the processor 120 in FIG. 1) may allocate a certain size of the free space 311 of the file system as a temporary memory storage space 312 for the fast data storage mode.

According to various embodiments, before storing data through the fast data storage mode, the application processor 229 may allocate in advance a borrowed space having a predetermined size for using the fast data storage mode. In an embodiment, the application processor 229 may receive an input, e.g., a user input, for entering a setting value for the fast data storage mode. The setting value for the fast data storage mode may include, for example, information about the size of the borrowed space 322 to be used for performing the fast data storage mode and information about whether to use the fast data storage mode. Based on the setting value for the fast data storage mode, the application processor 229 may allocate a portion of the free space 311 of the file system as the temporary memory space 312 for the fast data storage mode. For example, when the user sets the size of the borrowed space to 3 GB in the storage 230 having the free space 311 of a 40 GB size in total, the application processor 229 may allocate 3 GB of the free space 311 of the file system as the temporary memory space 312. In this case, the size of the free space of the file system may be reduced from 40 GB to 37 GB and displayed on the display.

According to various embodiments, allocating a predetermined size of the free space 311 of the file system to the temporary memory space 312 may be, for example, directly reducing the size of the free space 311 of the file system to a size corresponding to the size of the borrowed space 322 set by the user. Alternatively, it is possible to indirectly reduce the size of the free space of the file system by generating a file having a size of the borrowed space set by the user.

According to various embodiments, the application processor 229 may transfer the setting value for the fast data storage mode to the storage 230. For example, when the user sets the size of the borrowed space for the fast data storage mode to 3 GB, the application processor 229 may deliver information about the setting value 3 GB for the size of the borrowed space to the storage 230.

According to various embodiments, based on the setting value, the storage 230 may allocate in advance a certain size of the borrowed space 322 for the fast data storage mode. The size of the borrowed space 322 of the storage 230 may be equal to the size of the temporary memory space 312 of the file system. For example, when information about the setting value for setting the size of the borrowed space to 3 GB is received from the application processor 229, the storage 230 may allocate 3 GB of the empty space 321 to the borrowed space 322. According to various embodiments, the application processor 229 may recognize the temporary memory space 312 of the file system as the system data space.

According to various embodiments, when a certain size of the free space 311 of the file system is allocated to the temporary memory space 312, the application processor 229 may control the display to display information indicating that the setting of the fast data storage mode is completed. According to various embodiments, when a certain size of the free space 311 of the file system is allocated to the temporary memory space 312, the application processor 229 may control the display to display information indicating that the size of the free space 311 of the file system has been reduced by the size of the temporary memory space 312. The application processor 229 may disallow a user I/O request for additional data storage with respect to the borrowed space 322 of the storage 230 corresponding to the temporary memory space 312 of the file system. No generation of a user I/O request for additional data storage may cause no overlap with a write I/O request for the fast data storage mode generated inside the storage 230. Therefore, no overlap of the write I/O requests may not cause a data processing delay and write performance degradation of the storage 230.

FIG. 3D is a diagram illustrating an example case where a certain size of the free space 311 of the file system 310 is allocated to the temporary memory space 312, and thereby the application processor 229 may identify, through the file system, the size of the borrowed space 322 allocated for the fast data storage mode. In this case, the application processor 229 of the host 220 may receive a user input for entering a setting value for the fast data storage mode and, based on the setting value, allocate a portion of the free space 311 of the file system as the temporary memory space 312 for the fast data storage mode. For example, through the file system 310, the application processor 229 of the host 220 may allocate a 30 GB size of the memory space to the temporary memory space 312 for the fast data storage mode.

According to various embodiments, the application processor 229 may transfer the setting value for the fast data storage mode to the storage 230. For example, based on the setting value received from the application processor 229, the storage 230 may allocate the borrowed space 322 for the fast data storage mode to 30 GB. The size of the borrowed space 322 of the storage 230 may be equal to the size of the temporary memory space 312 set by the file system. In this case, the size of the free space 311a recognized by the application processor 229 of the host 220 may be synchronized with the size of the empty space 321a existing actually in the flash memory 231 of the storage 230.

When the size of the free space 311a identified by the application processor 229 through the file system is 60 GB, an additional data write request may only occur up to 60 GB. Therefore, there is no need of returning the borrowed space 322 of the flash memory 321 to the empty space 321 in order to perform an additional data write request, so that data writing performance and speed may be improved. Such data storage modes and data sizes are examples only, and any other mode and size may be applied.

Figure 4:
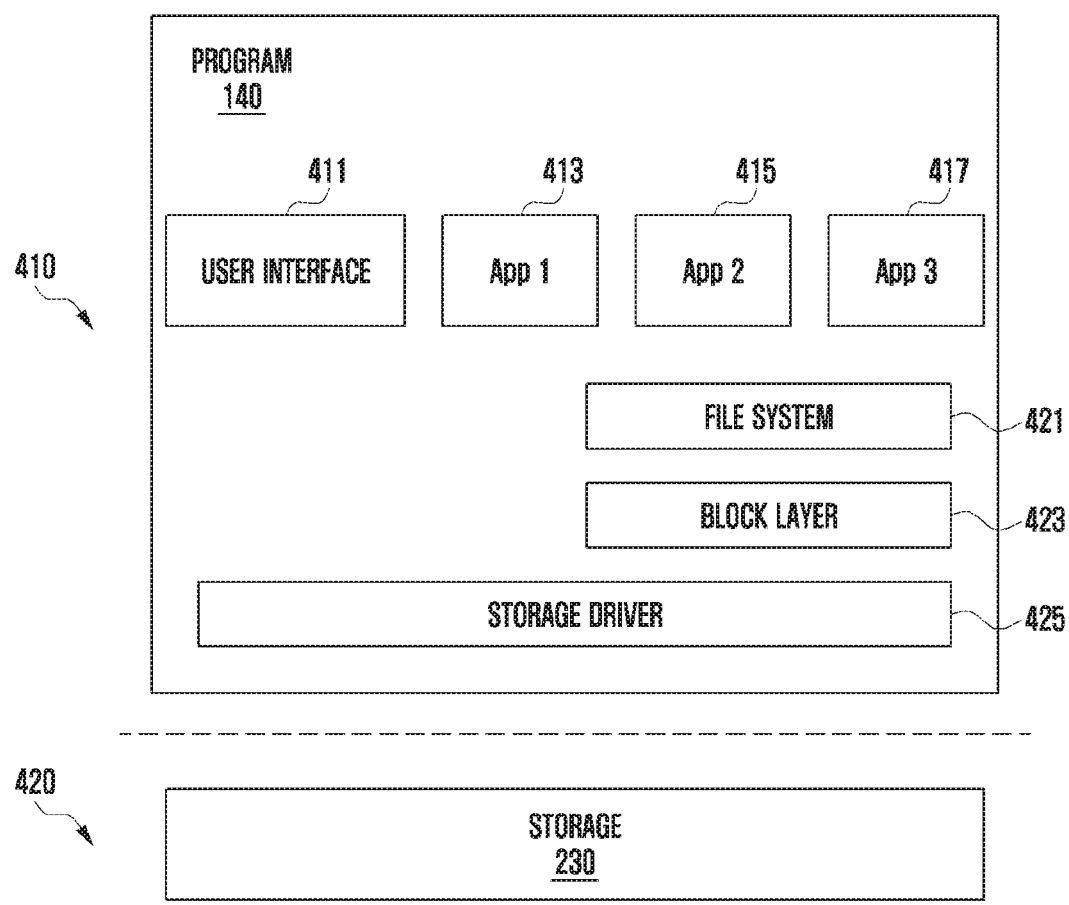
FIG. 4 is a block diagram illustrating an example hardware/software hierarchical architecture of an electronic device according to various embodiments.

FIG. 4 is a block diagram illustrating an example hardware/software hierarchical architecture of an electronic device according to various embodiments.

Referring to layer 410, in various embodiments, the program 140 may include a user interface 411, at least one application 413, 415, and/or 417, a file system 421, a block layer 423, and a storage driver 425. The program 140 may perform a particular function under the control of the application processor 229 (e.g., the processor 120 in FIG. 1). According to various embodiments, the application processor 229 may output, on the display, the user interface 411 (e.g., a UX interface) that allows inputting a setting value for the fast data storage mode. For example, the electronic device (e.g., the electronic device 101 in FIG. 1) may receive, through the user interface 411, a user input for setting the size of the borrowed space 322 for the fast data storage mode and whether to use the fast data storage mode.

According to various embodiments, based on the setting value received as the user input through the user interface 411, the application processor 229 may allocate a predetermined size of the free space 311 of the file system 421 as the temporary memory space 312 for the fast data storage mode. In addition, the application processor 229 may reduce the size of the free space 311 of the file system by the size of the temporary memory space 312. For example, when the size of the borrowed space 322 set by the user is 3 GB and the size of the free space 311 of the file system is 40 GB before the above allocation, the application processor 229 may set, through the file system 421, the size of the free space 311 to 37 GB and thereby allocate 3 GB of the 40 GB size to the temporary memory space 312. The application processor 229 may recognize the temporary memory space 312 of the file system as the system data space.

According to various embodiments, the application processor 229 may transfer the setting value for the fast data storage mode to the storage 230 through the storage driver 425. For example, the application processor 229 may deliver information about the size of the borrowed space 322 for the fast data storage mode set by the user to the storage 230 through the storage driver 425. The storage driver 425 may be, for example, a UFS driver. When the size of the borrowed space 322 set by the user is 3 GB, the application processor 229 may transmit information about the 3 GB size of the borrowed space 322 to the storage 230. Also, the application processor 229 may control the storage 230 to allocate 3 GB of the empty space 321 to the borrowed space 322 for the fast data storage mode.

Referring to layer 420, in various embodiments, the storage 230 (e.g., the nonvolatile memory 134 in FIG. 1) may allocate 3 GB of the empty space 321 to the borrowed space 322 for the fast data storage mode under the control of the application processor 229.

According to various embodiments, when the allocation of the borrowed space in the storage 230 is completed, the application processor 229 may output, through the display, information indicating that the setting for the fast data storage mode is completed.

According to various embodiments, the application processor 229 may check whether an event for starting data storage through the fast data storage mode occurs. When determining that the above event has occurred, the application processor 229 may control the storage 230 to perform data storage through the fast data storage mode using the borrowed space 322 having the allocated certain size. For example, when the storage 230 starts data storage through the turbo write function, the borrowed space 322 having a predetermined size may be used for temporarily storing data in the SLC mode. For example, if a 3 GB size is allocated to the borrowed space, data may be stored in the SLC mode within the 3 GB limit.

According to various embodiments, the application processor 229 may display, on the display, the user interface 411 that contains information about the fast data storage mode (e.g., size information for each memory space of the file system) and allows inputting the setting value for the fast data storage mode. When a portion of the empty space 321 of the storage 230 is allocated to the borrowed space 322, the application processor 229 may display, through the user interface 411, information indicating that the allocation for the fast data storage mode is completed and that the fast data storage mode is available.

According to various embodiments, when the size of the borrowed space 322 set by the user exceeds the size of the empty space 321 of the storage 230, the application processor 229 may display, through the user interface 411, information indicating that the fast data storage mode is not available. For example, when the size of the empty space 321 of the storage 230 is 2 GB, and when the size of the borrowed space 322 set by the user is 3 GB, the application processor 229 may display the unavailability of the fast data storage mode through the user interface 411.

According to various embodiments, the application processor 229 may check whether an event for starting data storage through the fast data storage mode occurs. For example, this start event may include at least one of a case where the number of storage write I/O requests generated to store data in the storage is equal to or greater than a given threshold (e.g., twenty storage write I/O requests or more), a case where the amount of storage write I/O requests to store data in the storage is equal to or greater than a given threshold (e.g., storage write I/O requests of 100 MB or more in total), a case where the electronic device is connected to the 5G network via the communication circuit and performs data communication, a case where the 5G modem is activated (e.g., booted up), a case where a fast data download function (e.g., a download boost function) is activated, a case where a file is downloaded using a file transfer protocol (FTP), a case where any external electronic device (e.g., USB, PCI device) capable of high-speed data transfer is connected to the electronic device, or a case where the high-speed data transfer starts from the connected external electronic device. The case where an external electronic device capable of high-speed data transfer is connected to the electronic device may include a case where a USB device of USB 3.0 or more is connected, and/or a case where a USB device of specific class such as a large storage class or a communication device class is connected.

According to various embodiments, when any event for starting data storage through the fast data storage mode occurs, the application processor 229 may control the storage 230 to perform data storage through the fast data storage mode using the borrowed space 322 having the allocated certain size. For example, the application processor 229 may deliver a command to start data storage in the fast data storage mode to the storage 230 through the storage driver 425. Using the borrowed space 322 having the allocated size, the storage 230 may perform fast data storage. For example, when the turbo write function of the storage 230 is activated, the storage 230 may temporarily store data in the SLC mode as much as the size of the borrowed space 322 and then store again the temporarily stored data in the TLC mode. For example, the temporarily stored data is moved to and stored again in the empty space 321 except for the borrowed space 322 of the storage 230.

According to various embodiments, while performing data storage through the fast data storage mode, the application processor 229 may check whether an event for terminating the data storage through the fast data storage mode occurs. For example, this termination event may include at least one of a case where the number of storage write I/O requests generated to store data in the storage is equal to or smaller than a given threshold (e.g., five storage write I/O requests or less), a case where the amount of storage write I/O requests to store data in the storage is equal to or smaller than a given threshold (e.g., storage write I/O requests of 5 MB or less in total), a case where the electronic device is disconnected from the 5G network, a case where the 5G modem is inactivated, a case where a fast data download function (e.g., a download boost function) is stopped, a case where a file download using a file transfer protocol (FTP) is stopped, a case where any external electronic device (e.g., USB, PCI device) capable of high-speed data transfer is disconnected from the electronic device, or a case where the high-speed data transfer from the connected external electronic device is terminated. The case where an external electronic device capable of high-speed data transfer is disconnected from the electronic device may include a case where a USB device of USB 3.0 or more is disconnected, and/or a case where a USB device of specific class such as a large storage class or a communication device class is disconnected.

According to various embodiments, when any event for terminating data storage through the fast data storage mode occurs, the application processor 229 may perform data storage through a default storage mode instead of the fast data storage mode. For example, when an event for terminating the turbo write function occurs, the application processor 229 may control the storage 230 to perform data storage in the TLC mode, predefined as the default storage mode, instead of the turbo write mode.

According to various embodiments, the application processor 229 may start storing data through the fast data storage mode, based on at least one of the number and amount of storage write I/O requests for storing data in the storage 230. For example, the application processor 229 may receive a data storage request from at least one of application 413, 415, and/or 417. In response to the data storage request, the application processor 229 may allow the data storage request within a limited space size excluding the size of the temporary memory space 312 of the free space 311 of the file system. The storage 230 may perform, under the control of the application processor 229, additional data storage within a limited space size excluding the size of the borrowed space 322 of the empty space 321 of the storage 230. For example, when 3 GB is allocated to the temporary memory space 312 and thus the size of the free space 311 is reduced from 40 GB to 37 GB, the application processor 229 may allow the data storage requests of the applications 413, 415, and 417 up to the size of 37 GB. The data storage requests of the applications 413, 415, and 417 may be converted into storage write I/O requests through the block layer 423. The storage write I/O requests may be transferred to the storage 230 through the storage driver 425.

According to various embodiments, a plurality of storage write I/O requests may occur simultaneously. In the program 140, the application processor 229 may identify at least one of the number and amount of storage write I/O requests to be delivered to the storage 230. For example, in a write buffer of the volatile memory (e.g., the volatile memory 132 in FIG. 1), the file system 421, or the block layer 423, the application processor 229 may continuously monitor at least one of the number and amount of the storage write I/O requests.

According to various embodiments, when the identified number or amount of storage write I/O requests is equal to or greater than a first threshold, the application processor 229 may perform data storage (i.e., fast data storage) through the fast data storage mode of the storage 230. For example, when twenty or more storage write I/O requests occur at the same time, the application processor 229 may start storing data through the fast data storage mode of the storage 230. For example, when storage write I/O requests of 100 MB or more in total occur at the same time, the application processor 229 may start storing data through the fast data storage mode of the storage 230.

According to various embodiments, when the number or amount of storage write I/O requests to be delivered to the storage 230 is equal to or smaller than a second threshold, the application processor 229 may terminate data storage through the fast data storage mode of the storage 230. For example, when the number of simultaneous storage write I/O requests is reduced to five or less, the application processor 229 may control the storage 230 to terminate the fast data storage. For example, when the amount of simultaneous storage write I/O requests is reduced to 10 MB or less in total, the application processor 229 may control the storage 230 to terminate the fast data storage. According to various embodiments, when data storage through the fast data storage mode of the storage 230 is terminated, the storage 230 may store data in the empty space 321 other than the borrowed space 322 using the default storage mode instead of the fast data storage mode. For example, when the turbo write function of the storage 230 is deactivated while activated, the storage 230 may directly store data in the empty space 321 instead of the borrowed space 322 in the TLC mode.

According to various embodiments, when no storage write I/O request is received from the application processor 229 for a specific time, the storage 230 may rewrite the data, temporarily stored in the borrowed space 322, to the empty space 321, and also delete the data stored in the borrowed space 322 to return the borrowed space 322 to the empty space 321. For example, when the storage 230 does not receive a storage write I/O request for 10 ms from the application processor 229, the storage 230 may rewrite the data temporarily stored in the borrowed space 322 to the empty space 321. For example, the storage 230 may rewrite the data, temporarily stored in the borrowed space 322 in SLC mode through the turbo write function, to the empty space 321 in the TLC mode, and delete the data temporarily stored in the borrowed space 322. This rewriting process may be a TLC migration process. According to various embodiments, when an additional storage write I/O request occurs while performing the rewriting process, the application processor 229 may deliver a command for stopping the rewriting process to the storage 230 through the storage driver 425.

According to various embodiments, the application processor 229 may control the storage 230 to start data storage through the fast data storage mode, based on a data transfer rate at which data is received from an external device. For example, the electronic device 101 may be connected to the 5G network through a communication circuit and receive data at a rate higher than a predetermined value through the 5G network. For example, the electronic device 101 may be connected to a USB meeting the USB 3.0 or USB 3.1 standard through the connecting terminal and receive data at a rate higher than a given value from the USB.

According to various embodiments, when receiving data from an external device, the application processor 229 may identify a data transfer rate by checking a throughput of data received during a unit time. According to various embodiments, the application processor 229 may control the storage 230 to start storing data through the fast data storage mode in response to receiving data from an external device at a rate higher than or equal to a predetermined value. According to various embodiments, the application processor 229 may activate the fast data storage mode in response to performing a fast file download through a file transfer protocol (FTP).

Figure 5:
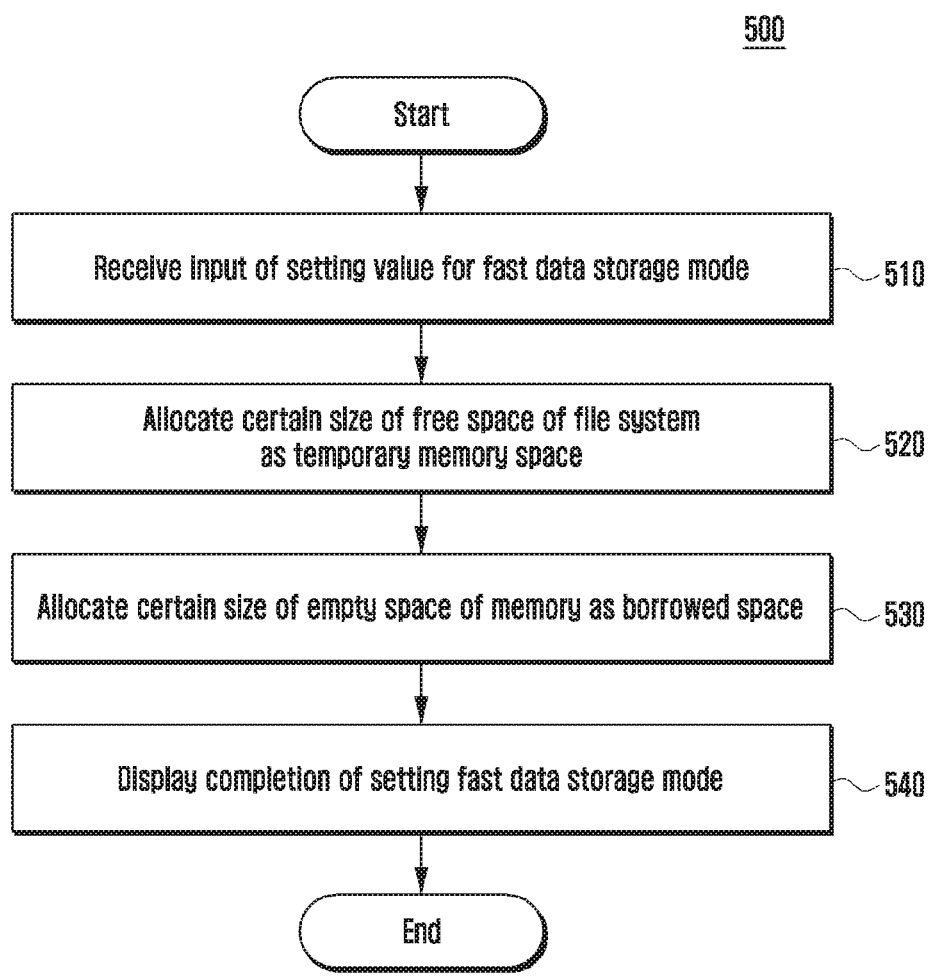
FIG. 5 is a flowchart illustrating example operations of an electronic device according to various embodiments.

FIG. 5 is a flowchart illustrating example operations of an example electronic device according to various embodiments.

FIG. 5 shows a flowchart 500 illustrating example operations (e.g., static allocation operations) of setting a borrowed space for a fast data storage mode, based on a setting value of a user.

Referring to the flowchart 500, in various embodiments, the electronic device (e.g., the electronic device 101 in FIG. 1) may set in advance the borrowed space for the fast data storage mode before a memory (e.g., the nonvolatile memory 134 in FIG. 1, the storage 230 in FIG. 2A) performs fast data storage.

At operation 510, the application processor 229 (e.g., the processor 120 in FIG. 1) of the electronic device 101 may receive an input, e.g., a user input, for entering a setting value of the fast data storage mode through a user interface (e.g., the user interface 411 in FIG. 4) displayed on the display. For example, the application processor 229 may display, on the display, the user interface that contains information about the fast data storage mode of the storage 230. For example, through the user interface, the electronic device 101 may display information about the fast data storage mode of the storage 230 and receive a user input for entering a setting value for the fast data storage mode. The setting value for the fast data storage mode may include, for example, information about the size of the borrowed space (e.g., the borrowed space 322 in FIG. 3A) to be used for performing the fast data storage mode and information about whether to use the fast data storage mode.

At operation 520, the application processor 229 may allocate a certain size of a free space (e.g., the free space 311 in FIG. 3A) of the file system as a temporary memory space (e.g., the temporary memory space 312 in FIG. 3A). For example, based on the setting value for the fast data storage mode, the application processor 229 may allocate a certain size of the free space of the file system as the temporary memory space for the fast data storage mode. For example, based on the information about the size of the borrowed space for performing the fast data storage mode, the application processor 229 may allocate a certain size of the free space of the file system as the temporary memory space for the fast data storage mode.

At operation 530, the application processor 229 may control the storage 230 to allocate a certain size of an empty space (e.g., the empty space 321 in FIG. 3A) of the storage 230 as a borrowed space for the fast data storage mode. For example, the application processor 229 may control the storage 230 to allocate a certain size of the empty space of the storage 230 as the borrowed space to correspond to the size of the temporary memory space. The size of the temporary memory space of the file system may be equal to the size of the borrowed space of the storage 230. The application processor 229 may transfer the setting value for the fast data storage mode to the storage 230. For example, the application processor 229 may deliver the information about the size of the borrowed space for the fast data storage mode set by the user to the storage 230. Based on the received setting value, the storage 230 may allocate a certain size of the empty space as the borrowed space.

At operation 540, the application processor 229 may control the display to display information indicating that the setting of the fast data storage mode is completed. For example, when the borrowed space having a certain size is allocated, the application processor 229 may display, through the display, information indicating that the allocation of the borrowed space for the fast data storage mode has been completed, and information indicating that data storage can be started through the fast data storage mode.

Figure 6:
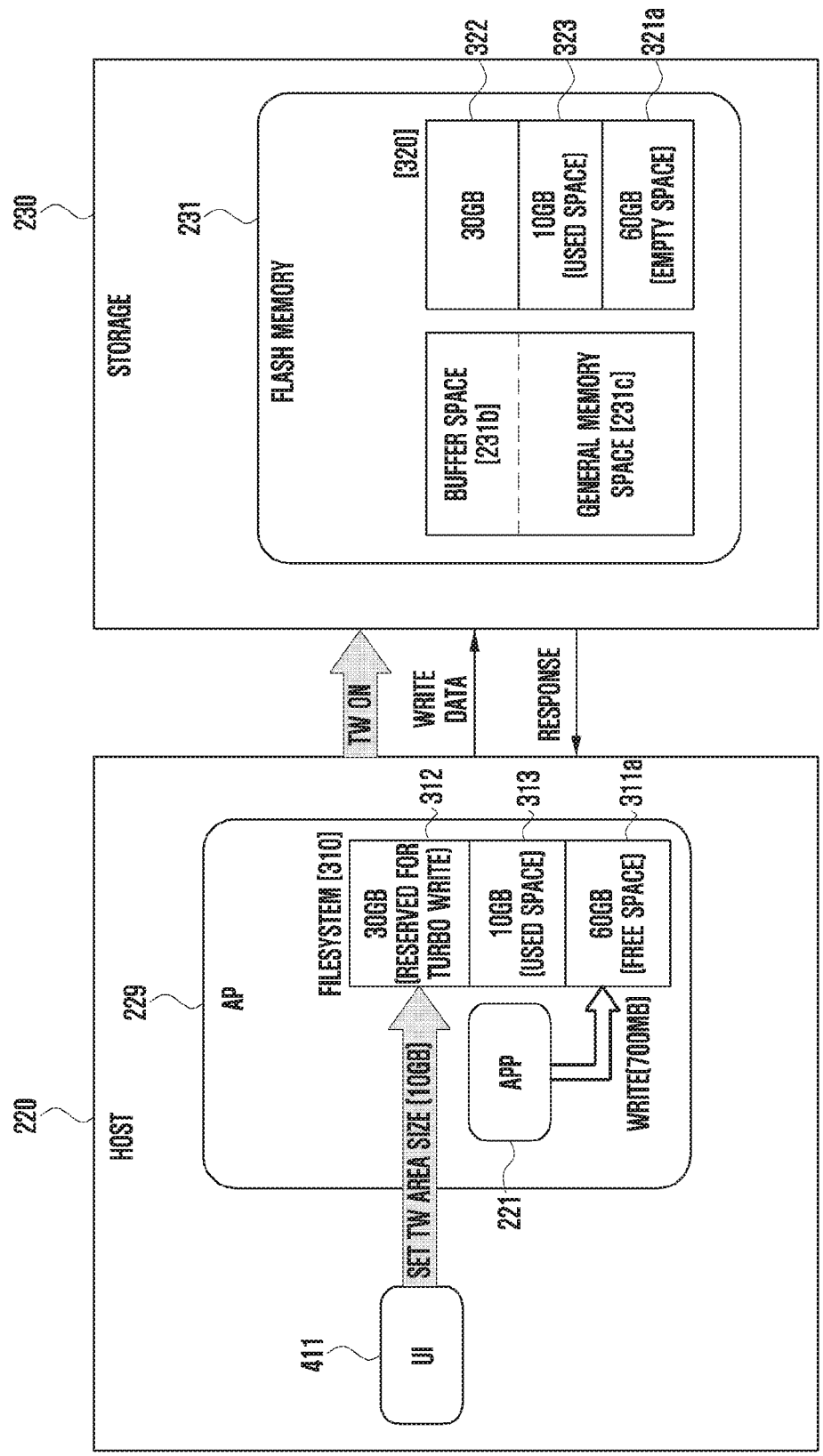
FIG. 6 is a block diagram illustrating example operations of an example electronic device when performing a setting operation for setting a borrowed space for a fast data storage mode based on a user's setting value according to various embodiments.

FIG. 6 is a block diagram illustrating example operations of an electronic device when performing a setting operation (e.g., static allocation operation) for setting a borrowed space for a fast data storage mode based on a user's setting value according to various embodiments.

Referring to FIG. 6, the application processor 229 (e.g., the processor 120 in FIG. 1) may display the user interface (UI) 411 through the display. The user interface 411 may display memory spaces of the file system, and may contain a setting region for inputting the setting value of the fast data storage mode and a region for releasing the setting for the fast data storage mode (e.g., activating/deactivating the fast data storage mode). For example, through the user interface, the application processor 229 may set to store 10 GB data in the fast data storage mode. Assuming that the default storage mode of the flash memory 321 of the storage 230 is the TLC mode, the memory space size displayed through the file system is the memory space size in the TLC mode, and data is temporarily stored in the SLC mode which is the fast data storage mode. Thus, for storing 10 GB data, the application processor 229 may set the size of the temporary memory space 312 to 30 GB. The application processor 229 may transmit a control command to the storage 230 to allocate the size of the borrowed space 322 for the fast data storage mode. Therefore, the storage 230 may allocate 30 GB of the empty space 321 of the flash memory 231 to the borrowed space 322 for the fast data storage mode. In embodiments, the storage 230 may store data in the borrowed space 322 at a high speed using the SLC mode.

The application processor 229 may receive a user input for releasing the setting of the fast data storage mode. For example, through the user interface, the user may set no use of the fast data storage mode. For example, the application processor 229 may receive a user input for returning the borrowed space allocated in the memory. The temporary memory space 312 set through the file system may be maintained until a user input for releasing the setting of the fast data storage mode is received.

Figure 7:
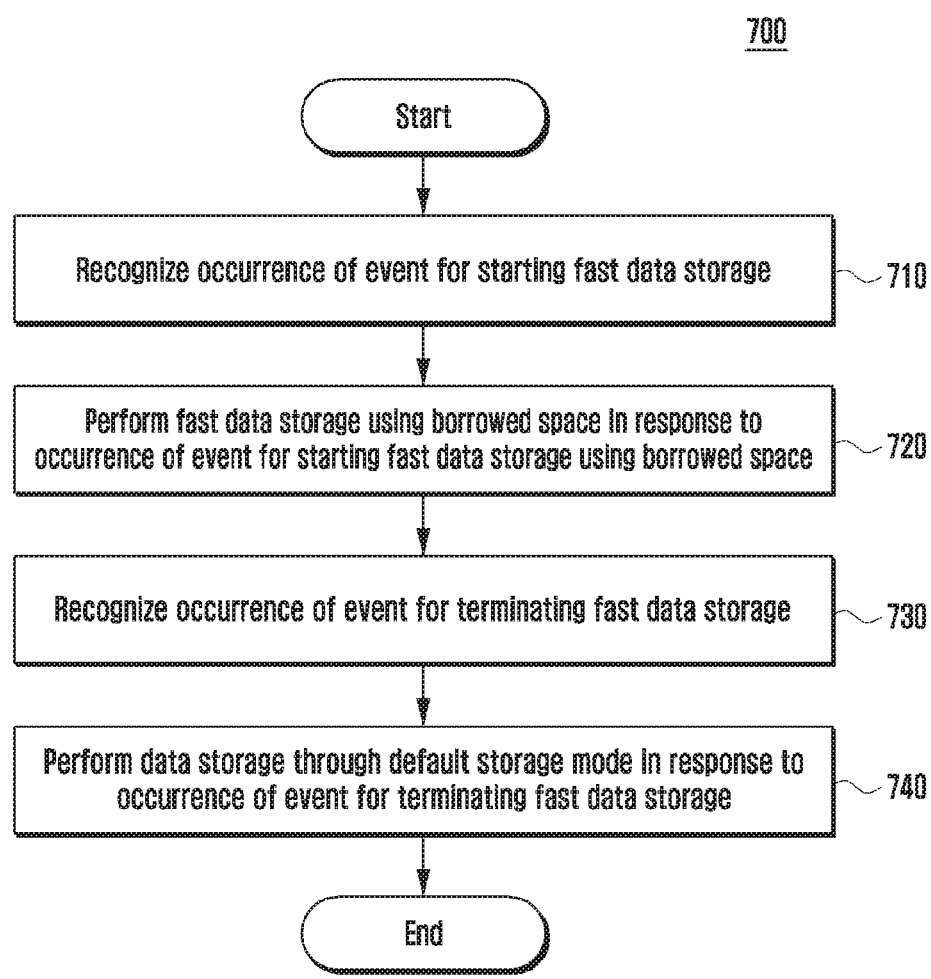
FIG. 7 is a flowchart illustrating example operations of an example electronic device according to various embodiments.

FIG. 7 is a flowchart illustrating example operations of an electronic device according to various embodiments.

FIG. 7 shows a flowchart 700 illustrating example operations of the electronic device (e.g., the electronic device 101 in FIG. 1) that performs fast data storage after completing setting for a fast data storage mode.

Referring to the flowchart 700, in various embodiments, the electronic device may perform the fast data storage using a borrowed space having a certain size previously allocated.

At operation 710, the application processor 229 (e.g., the processor 120 in FIG. 1) of the electronic device 101 may check and recognize whether an event for starting fast data storage through the fast data storage mode occurs. For example, this start event may include at least one of a case where the number of storage write I/O requests generated to store data in a memory (e.g., the nonvolatile memory 134 in FIG. 1, the storage 230 in FIG. 2A) is equal to or greater than a given threshold (e.g., twenty storage write I/O requests or more), a case where the amount of storage write I/O requests to store data in the memory is equal to or greater than a given threshold (e.g., storage write I/O requests of 100 MB or more in total), a case where the electronic device is connected to the 5G network via the communication circuit and performs data communication, a case where the 5G modem is activated (e.g., booted up), a case where a fast data download function (e.g., a download boost function) is activated, a case where a file is downloaded using a file transfer protocol (FTP), a case where any external electronic device (e.g., USB, PCI device) capable of high-speed data transfer is connected to the electronic device, or a case where the high-speed data transfer starts from the connected external electronic device. For example, based on at least one of the number and amount of write I/O requests for storing data in the memory, the application processor 229 may determine whether to start data storage through the fast data storage mode. For example, based on a data transfer rate at which data is received from an external device, the application processor 229 may determine whether to start the fast data storage of the storage 230.

At operation 720, in response to the occurrence of the event for starting the fast data storage, the application processor 229 may control the memory to perform the fast data storage using the borrowed space having the allocated certain size. For example, using the borrowed space having the allocated size, the memory may perform the fast data storage. For example, the fast data storage mode of the memory may be a turbo write function that meets the UFS standard. When the fast data storage is started through the turbo write function of the memory, the memory may temporarily store data in the borrowed space having a certain size through the SLC mode and then rewrite the temporarily stored data through the TLC mode to move and store again the temporarily stored data in the empty space of the memory.

At operation 730, the application processor 229 may check and recognize whether an event for terminating the fast data storage occurs. For example, this termination event may include at least one of a case where the number of storage write I/O requests generated to store data in the memory is equal to or smaller than a given threshold (e.g., five storage write I/O requests or less), a case where the amount of storage write I/O requests to store data in the memory is equal to or smaller than a given threshold (e.g., storage write I/O requests of 5 MB or less in total), a case where the electronic device is disconnected from the 5G network, a case where the 5G modem is inactivated, a case where a fast data download function (e.g., a download boost function) is stopped, a case where a file download using a file transfer protocol (FTP) is stopped, a case where any external electronic device (e.g., USB, PCI device) capable of high-speed data transfer is disconnected from the electronic device, or a case where the high-speed data transfer from the connected external electronic device is terminated.

At operation 740, in response to the occurrence of the event for terminating the fast data storage, the application processor 229 may perform data storage through a default storage mode instead of the fast data storage mode. For example, when an event for terminating the turbo write function occurs, the application processor 229 may control the memory to perform data storage in the TLC mode, predefined as the default storage mode, instead of the turbo write mode.

Figure 8A:
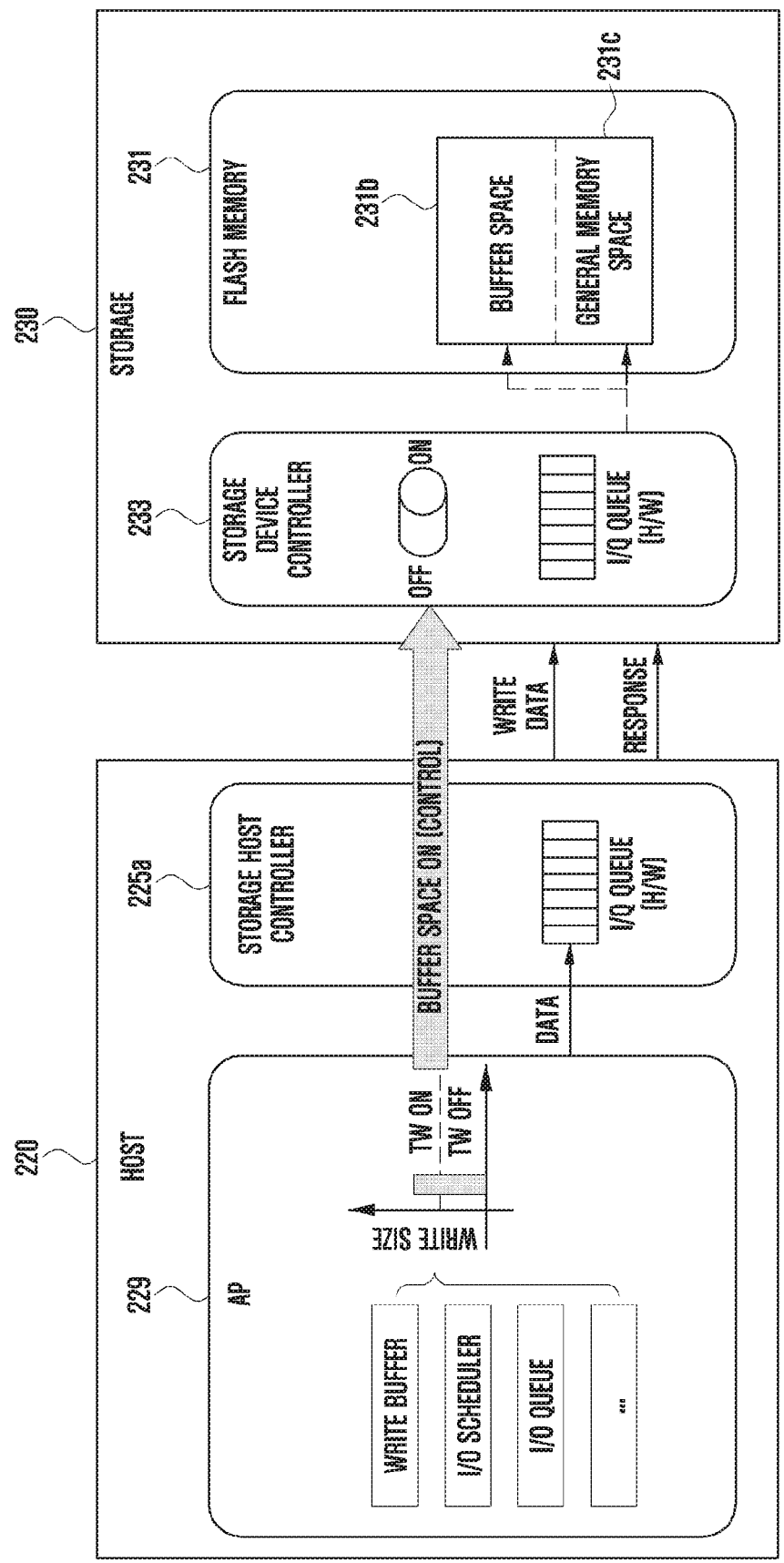
FIGS. 8A and 8B are block diagrams illustrating example operations of an example electronic device when fast data storage starts according to various embodiments.
Figure 8B:
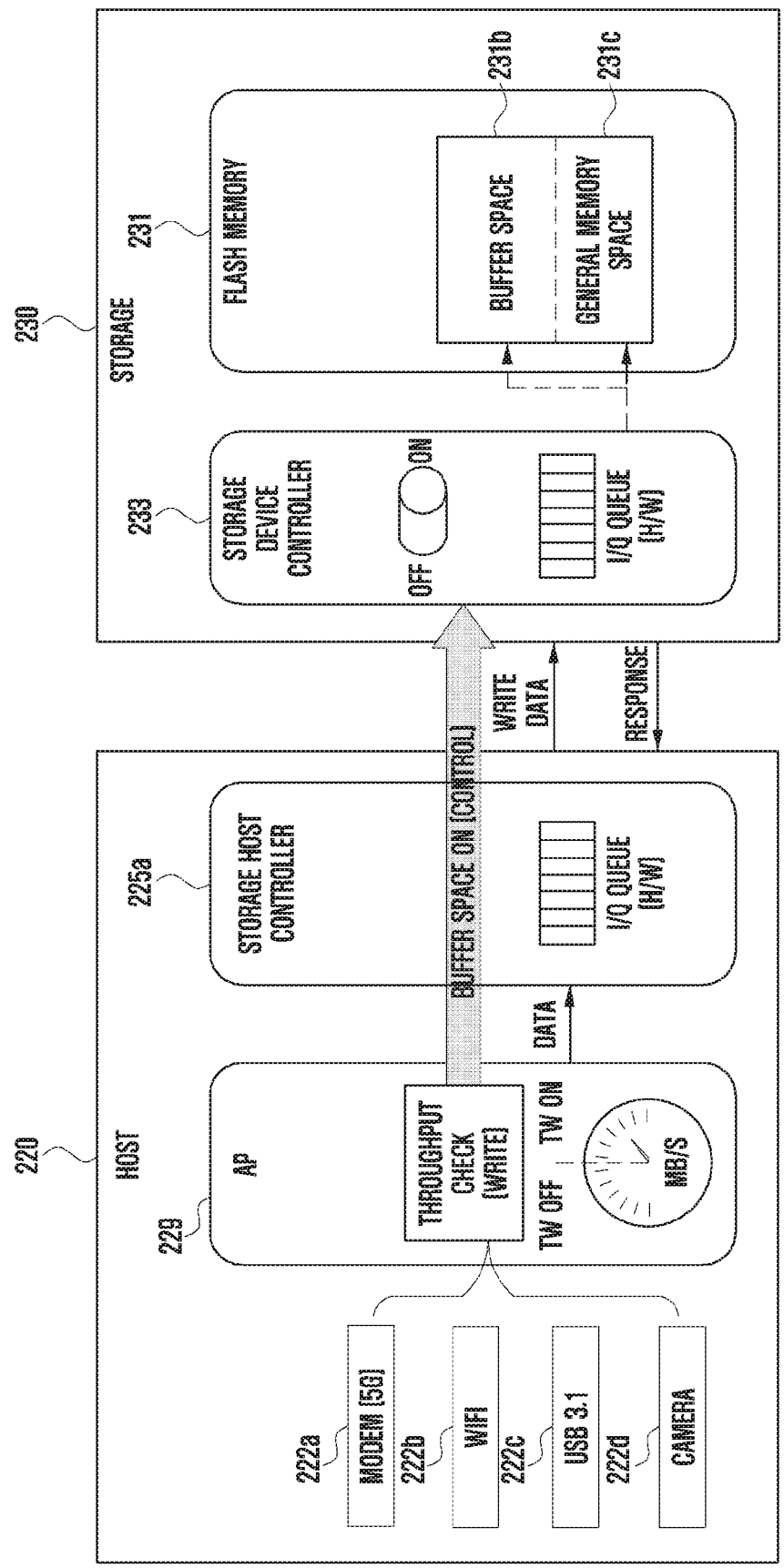

FIGS. 8A and 8B are block diagrams illustrating example operations of an electronic device when fast data storage starts according to various embodiments. FIG. 8A shows operations of the electronic device 101 that performs the fast data storage through the fast data storage mode based on the number or amount of storage write I/O requests or data write I/O requests, and FIG. 8B shows operations of the electronic device 101 that performs the fast data storage through the fast data storage mode based on data throughput.

Referring to FIG. 8A, the application processor 229 (e.g., the processor 120 in FIG. 1) may recognize an event for starting data storage through the fast data storage mode (e.g., the turbo write mode) and, in response to the occurrence of the event, control the storage 230 to perform the data storage through the fast data storage mode. In various embodiments, based on at least one of the number and amount of storage write I/O requests generated to store data in the memory, the application processor 229 may determine whether to start the data storage through the fast data storage mode.

The application processor 229 may identify, in the program 140, at least one of the number and amount of storage write I/O requests to be delivered to the storage 230. The storage write I/O requests may occur simultaneously, and the application processor 229 may identify at least one of the number and amount of the simultaneously occurring storage write I/O requests to be delivered to the storage 230. For example, the application processor 229 may identify at least one of the number and amount of storage write I/O requests that have been not transferred to the storage 230 yet and exist in the program 140.

For example, when the amount of storage write I/O requests existing in an I/O scheduler of the application processor 229 is 30 MB or more, the application processor 229 may determine to perform data storage through the fast data storage mode (e.g., the turbo write mode) and control, through the storage host controller 225a, the storage 230 to perform data storage in the fast data storage mode. For example, in this case, the application processor 229 may activate the fast data storage function of the storage 230 by transmitting a control command for activating the fast data storage mode to the storage 230. The I/O scheduler may be, for example, a program that shares a function of selecting a process to be performed next by priority or the like when there is a queue in the host 220. The I/O queue may be, for example, a program that memorizes a queue of I/O requests. In the above, 30 MB is merely an example, and any other value may be used by user's setting.

Referring to FIG. 8B, based on a data transfer rate at which data is received from an external device, the application processor 229 may determine whether to start storing data through the fast data storage mode of the storage 230.

The application processor 229 may identify throughput of data received through a component (e.g., the communication circuit, the camera, the connecting terminal) of the host 220 of the electronic device 101. For example, the application processor 229 may identify a data transfer rate by identifying the throughput of data received per unit time through the communication circuit (e.g., the 5G communication module 222a, the Wi-Fi communication module 222b), the connecting terminal (e.g., the USB 3.1 connecting terminal 222c), or the camera 222d of the host 220. In response to receiving data from the external device at a rate higher than a given value, the application processor 229 may control the storage 230 to start the fast data storage.

For example, when the data throughput per unit time (data transfer rate) transferred from the 5G network to the application processor 229 through the communication circuit of the electronic device 101 is 300 MB/s or more, the application processor 229 may control, through the storage host controller 225a, the storage 230 to perform data storage in the fast data storage mode. For example, in this case, the application processor 229 may activate the fast data storage function of the storage 230. In an example embodiment, the application processor 229 may activate the fast data storage mode in response to performing a fast file download through a file transfer protocol (FTP). In the above, 300 MB/s is merely an example, and any other value may be used by user's setting.

Figure 9:
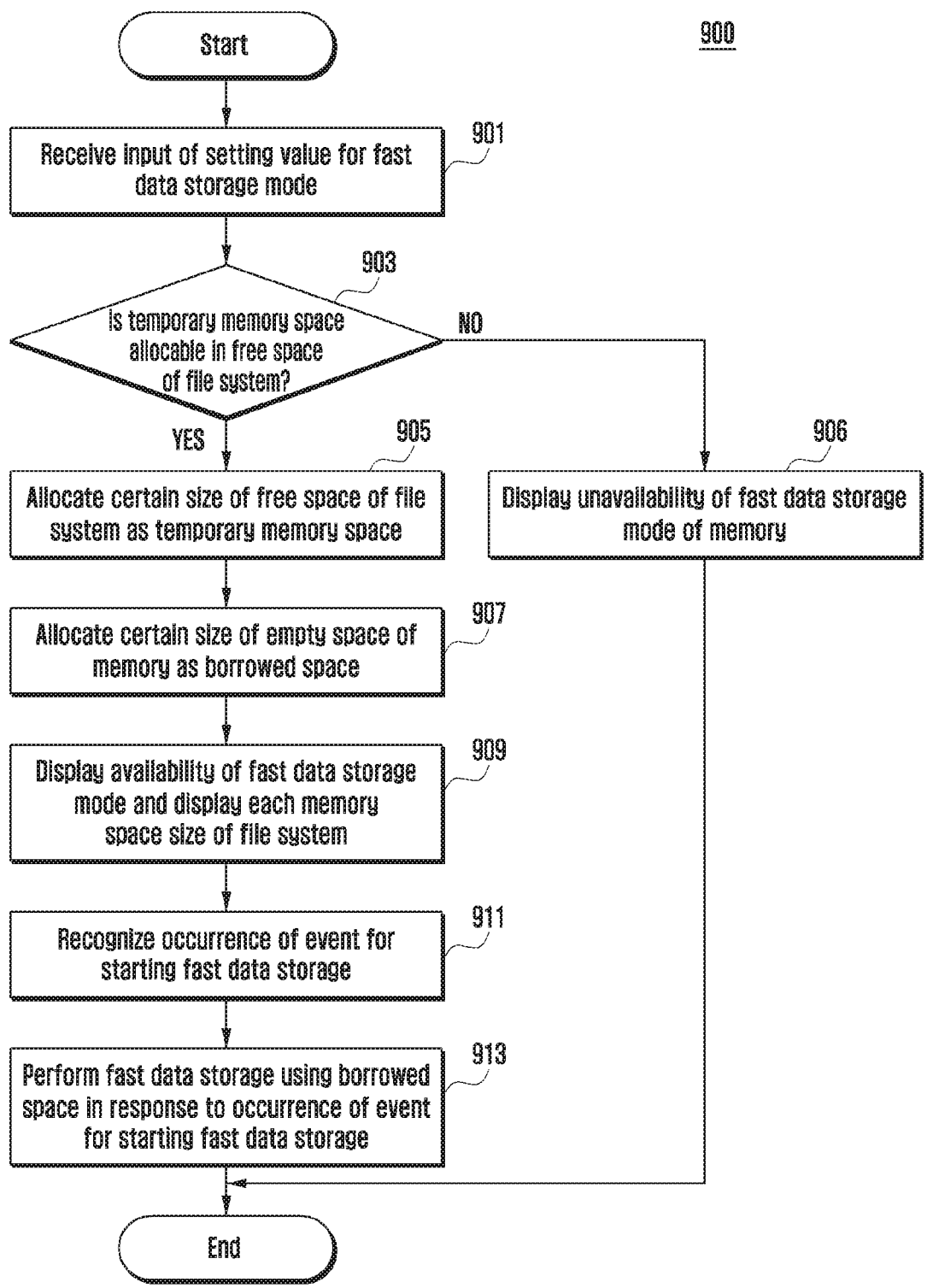
FIG. 9 is a flowchart illustrating example operations of an example electronic device according to various embodiments.

FIG. 9 is a flowchart illustrating example operations of an electronic device according to various embodiments.

Referring to an operation flowchart 900, at operation 901, the application processor 229 (e.g., the processor 120 in FIG. 1) may receive and input, e.g., a user input, for inputting a setting value of the fast data storage mode through a user interface (e.g., the user interface 411 in FIG. 4) displayed on the display. The setting value for the fast data storage mode may include information about a size of a borrowed space (e.g., the borrowed space 322 in FIG. 3C) to be used for performing the fast data storage mode and information indicating whether to use the fast data storage mode.

At operation 903, the application processor 229 may determine whether to allocate, for a temporary memory space (e.g., the temporary memory space 312 in FIG. 3C), a certain size of a free space (e.g., the free space 311 in FIG. 3C) of a file system corresponding to the setting value of the fast data storage mode. For example, when the user sets the size of the borrowed space for the fast data storage mode to 3 GB, the application processor 229 may determine whether the temporary memory space of 3 GB is allocable in the free space of the file system. For example, when the size of the free space of the file system is less than 3 GB, the application processor 229 may determine that the temporary memory space is not allocable in the free space. For example, when the size of the free space of the file system is 3 GB or more, the application processor 229 may determine that the temporary memory space is allocable in the free space.

When it is determined at operation 903 that the temporary memory space is not allocable in the free space of the file system ("No" in operation 903), the application processor 229 may display, at operation 906, information indicating unavailability of the fast data storage mode of the memory (e.g., the nonvolatile memory 134 in FIG. 1, the storage 230 in FIG. 2A) through the display.

When it is determined at operation 903 that the temporary memory space is allocable in the free space of the file system ("Yes" in operation 903), the application processor 229 may allocate, at operation 905, a certain size of the free space of the file system as the temporary memory space for the fast data storage mode.

At operation 907, the application processor 229 may control the memory to allocate a certain size of an empty space of the memory as a borrowed space for the fast data storage mode. For example, the application processor 229 may transmit information about the size of the borrowed space for the fast data storage mode set by the user to the memory. Based on this information about the size of the borrowed space, the memory may allocate a predetermined size of the empty space to the borrowed space.

At operation 909, the application processor 229 may display, through the display, information indicating availability of the fast data storage mode of the memory and may also display each memory space size of the file system. For example, the application processor 229 may display the size of each of the free space, the user data space, and the system data space of the file system. In embodiments, the temporary memory space allocated with a certain size for the fast data storage mode may be recognized as the system data space. For example, the size of the free space may be displayed as being reduced by the size of the temporary memory space allocated for the fast data storage mode, and the size of the system data space may be displayed as being increased.

At operation 911, the application processor 229 may check and recognize whether an event for starting fast data storage through the fast data storage mode of the memory occurs.

At operation 913, in response to the occurrence of the event for starting the fast data storage, the application processor 229 may control the memory to perform the fast data storage using the borrowed space of an allocated size. For example, using the borrowed space of a certain allocated size, the memory may perform the fast data storage mode.

Figure 10:
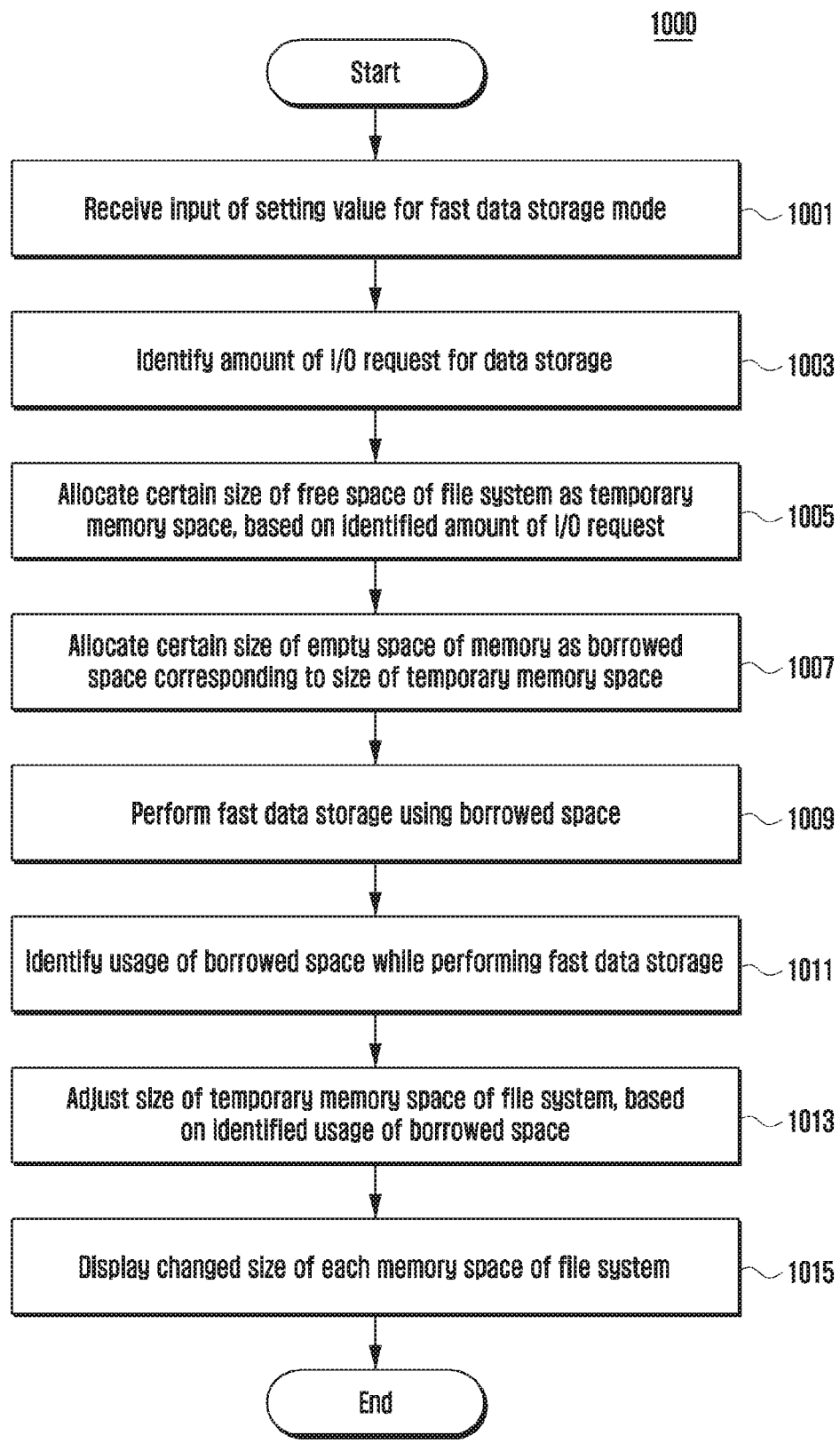
FIG. 10 is a flowchart illustrating example operations of an example electronic device according to various embodiments.

FIG. 10 is a flowchart illustrating example operations of an electronic device according to various embodiments.

FIG. 10 shows a flowchart 1000 illustrating example operations (e.g., dynamic allocation operations) of the electronic device (e.g., the electronic device 101 in FIG. 1) that sets a borrowed space for a fast data storage mode, based on the amount of storage I/O requests generated.

Referring to the flowchart 1000, at operation 1001, the application processor 229 (e.g., the processor 120 in FIG. 1) of the electronic device 101 may receive an input, e.g., a user input, for inputting a setting value for the fast data storage mode.

At operation 1003, the application processor 229 may identify the amount of generated I/O requests (storage write I/O requests) for storing data. When the amount of the I/O requests is equal to or greater than a given threshold, the application processor 229 may control the memory (e.g., the nonvolatile memory 134 in FIG. 1, the storage 230 in FIG. 2A) to start fast data storage through the fast data storage mode.

At operation 1005, based on the identified amount of the I/O requests, the application processor 229 may allocate a certain size of the free space of the file system as the temporary memory space. For example, the size of the temporary memory space may be determined based on the identified amount of the I/O requests within the limit of the setting value entered by the user. For example, when the user sets the size of the borrowed space to 3 GB, and when the amount of actually generated storage write I/O requests is 1 GB, the application processor may set a 1 GB size of the free space of the file system as the size of the temporary memory space. For example, when the user sets the size of the borrowed space to 3 GB, and when the amount of actually generated storage write I/O requests is 4 GB, the application processor may set a 3 GB size of the free space of the file system as the size of the temporary memory space.

At operation 1007, the application processor 229 may control the memory to allocate a certain size of the empty space of the memory as the borrowed space corresponding to the size of the temporary memory space.

At operation 1009, the application processor 229 may perform the fast data storage using the borrowed space of the allocated size.

At operation 1011, the application processor 229 may identify the current usage of the borrowed space while performing the data storage through the fast data storage mode. For example, even if the size of the borrowed space for the fast data storage mode is set to 3 GB through a user interface (e.g., the user interface 411 in FIG. 4), only 1 GB of the borrowed space may be used when the amount of storage write I/O requests currently delivered to the memory is 1 GB. In this case, the memory may transmit information about the current usage of the borrowed space to the application processor 229. The application processor 229 may identify that the current usage of the borrowed space of the memory is 1 GB.

At operation 1013, the application processor 229 may adjust the size of the temporary memory space of the file system, based on the identified usage of the borrowed space. For example, when the size of the borrowed space set by the user is 3 GB, and when the identified usage of the borrowed space is 1 GB, the application processor 229 may adjust the size of the temporary memory space 312 of the file system to 1 GB.

At operation 1015, the application processor 229 may display, through the display, a changed size of each memory space of the file system. For example, when the size of the temporary memory space of the file system is adjusted from 3 GB to 1 GB, the size of the free space (e.g., the free space 311 in FIG. 3A) of the file system may be displayed as being increased by 2 GB.

Figure 11:
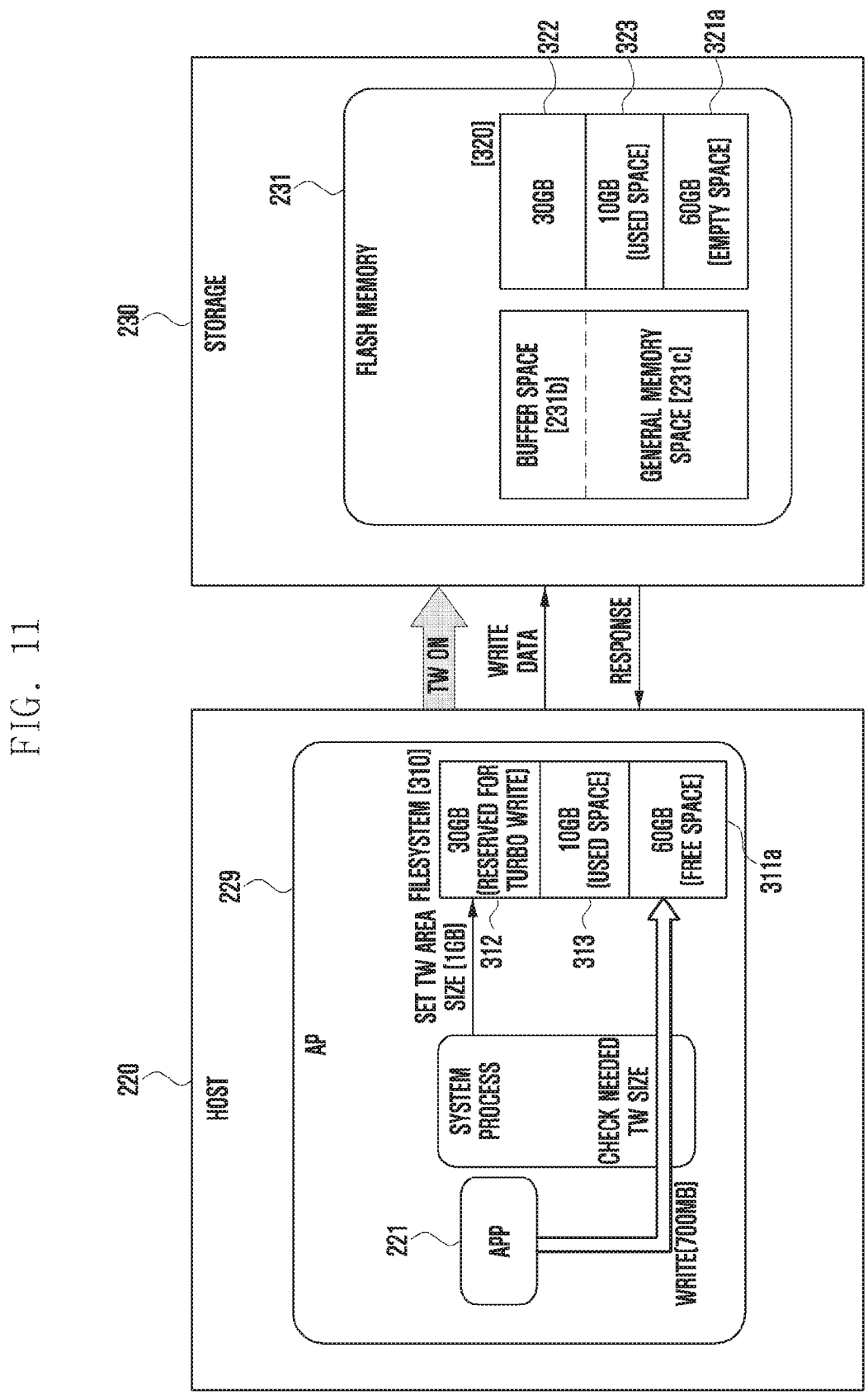
FIG. 11 is a block diagram illustrating example operations of an example electronic device when performing a setting operation for setting a borrowed space for a fast data storage mode, based on the amount or number of storage I/O requests generated according to various embodiments.

FIG. 11 is a block diagram illustrating example operations of an electronic device when performing a setting operation (e.g., dynamic allocation operation) for setting a borrowed space for a fast data storage mode, based on the amount or number of storage I/O requests generated according to various embodiments.

Referring to FIG. 11, the application processor 229 (e.g., the processor 120 in FIG. 1) may identify the amount of generated I/O requests (write I/O requests) for storing data. For example, the application processor 229 may identify the amount of storage write I/O requests generated.

The application processor 229 may allocate a certain size of the free space of the file system as the temporary memory space, based on the identified amount of storage write I/O requests. For example, the size of the temporary memory space may be determined based on the amount of I/O requests within the limit of the setting value entered by the user. For example, when the amount of generated storage write I/O requests is 700 MB, the application processor 229 may set 1 GB, which is greater than 700 MB, of the free space of the file system as the size of the temporary memory space. The application processor 229 may control the memory to allocate 1 GB of the empty space of the memory as the borrowed space in correspondence with the 1 GB size of the temporary memory space.

When determining that it is not necessary to maintain the borrowed space, the application processor 229 may adjust the size of the borrowed space of the memory by adjusting the size of the temporary memory space 312 of the file system. For example, the application processor 229 may identify the current usage of the borrowed space while performing data storage using the fast data storage mode. If the borrowed space is not currently used, the application processor 229 may release the allocated temporary memory space of the file system (e.g., adjust the size of the temporary memory space of the file system to 0 GB). In this case, the application processor 229 may control the memory to release the borrowed space allocated to the memory (e.g., adjust the size of the borrowed space of the memory to 0 GB).

Figure 12:
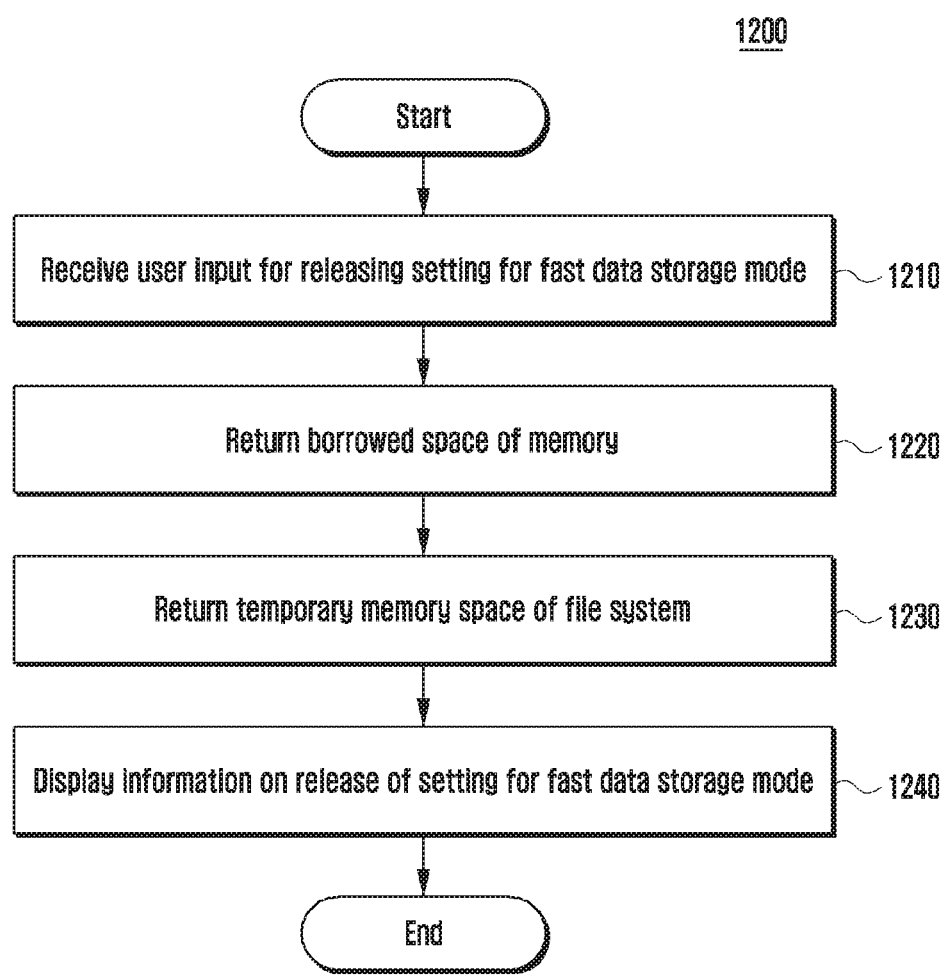
FIG. 12 is a flowchart illustrating example operations of an example electronic device according to various embodiments.

FIG. 12 is a flowchart illustrating example operations of an electronic device according to various embodiments.

FIG. 12 shows a flowchart 1200 illustrating example operations of the electronic device (e.g., the electronic device 101 in FIG. 1) that releases setting for a fast data storage mode of a memory (e.g., the nonvolatile memory 134 in FIG. 1, the storage 230 in FIG. 2A).

Referring to the flowchart 1200, at operation 1201, the application processor 229 (e.g., the processor 120 in FIG. 1) may receive an input, e.g., a user input, for releasing the setting for the fast data storage mode through a user interface (e.g., the user interface 411 in FIG. 4) displayed on the display. For example, the user may set no use of the fast data storage mode through the user interface. For example, the application processor 229 may receive a user input for returning the borrowed space of the memory.

At operation 1220, the application processor 229 may control the memory (e.g., the storage 230 in FIG. 2A) to return the borrowed space having a certain size. For example, in response to receiving a user input for deactivating the fast data storage mode, the application processor 229 may transmit a control command to the memory to deactivate the fast data storage mode. The memory may rewrite the data, temporarily stored in the borrowed space (e.g., the borrowed space 322 in FIG. 3B), to the empty space (e.g., the empty space 321 in FIG. 3B) except the borrowed space. Also, the memory may delete the data temporarily stored in the borrowed space. When all the data temporarily stored in the borrowed space is moved to and stored again in the empty space 321, the memory may return the borrowed space to the empty space and deliver, to the application processor 229, information indicating that the setting for the fast data storage mode is released. For example, the memory may deliver, to the application processor 229, information indicating that the borrowed space has been returned to the empty space.

At operation 1230, the application processor 229 may return the temporary memory space of the file system to the free space. For example, in response to receiving from the memory the information indicating that the setting for the fast data storage mode has been released, the application processor 229 may return the temporary memory space allocated for the fast data storage mode to the free space. Therefore, the size of the free space in the file system may be increased again by the size of the temporary memory space.

At operation 1240, the application processor 229 may display, on the display, information indicating that the setting for the fast data storage mode of the memory has been released.

While performing the above operation 1220 or 1230, the application processor 229 may display, through the display, information indicating that the setting for the fast data storage mode is being released, and information about a time required for returning the borrowed space to the empty space and about memory performance degradation.

According to various embodiments of the disclosure, an electronic device may include: a display, a memory (e.g., the nonvolatile memory 134 in FIG. 1, the storage 230 in FIG. 2A) including a first space storing no data and a second space and storing data, and a processor (e.g., the processor 120 in FIG. 1, the application processor 229 in FIG. 2B). The processor may be configured to control the electronic device to: receive an input for inputting a setting value for a fast data storage mode of the memory, to allocate a predetermined size of a free space of a file system of the electronic device as a temporary memory space for the fast data storage mode based on the setting value for the fast data storage mode, to control the memory to allocate a predetermined size of the first space as a borrowed space for the fast data storage mode corresponding to the size of the temporary memory space, to recognize occurrence of an event for starting data storage through the fast data storage mode, and to control the memory to perform the data storage using the borrowed space through the fast data storage mode in response to the occurrence of the event.

In the electronic device according to various example embodiments, the setting value for the fast data storage mode may include information about a size of the borrowed space to be used for performing the fast data storage mode and information about whether the fast data storage mode is used.

In the electronic device according to various example embodiments, the processor may be further configured to control the electronic device to, in response to allocation of the temporary memory space having the predetermined size, display through the display a size of the free space of the file system as being reduced by the size of the temporary memory space, or generate a file having the size of the temporary memory space to display the size of the free space of the file system as being reduced.

In the electronic device according to various example embodiments, the processor may be further configured to control the electronic device to identify at least one value of the number and amount of write input/output (I/O) requests that are generated to store data in the memory and are to be delivered to the memory, and to control the memory to start the data storage through the fast data storage mode when the identified value is equal to or greater than a first threshold.

In the electronic device according to various embodiments, the processor may be further configured to control the electronic device to periodically identify the at least one value, and to control the memory to terminate the data storage through the fast data storage mode when the identified value is equal to or smaller than a second threshold.

In the electronic device according to various embodiments, the processor may be further configured to control the electronic device to, in response to occurrence of a write input/output (I/O) request for storing additional data beyond the borrowed space while performing the data storage through the fast data storage mode, control the memory to perform additional data storage within a space size limit except for the borrowed space in the first space of the memory.

In the electronic device according to various embodiments, the processor may be further configured to control the electronic device to receive, from the memory, information about a space size currently used to perform the data storage through the fast data storage mode in the borrowed space, and to adjust the size of the temporary memory space based on the received information.

In the electronic device according to various embodiments, the processor may be further configured to control the electronic device to receive an input, e.g., a user input, for releasing setting for the fast data storage mode of the memory, to control the memory to store again data, temporarily stored in the borrowed space of the memory, in a space other than the borrowed space of the first space of the memory and delete the data temporarily stored in the borrowed space, and to return the temporary memory space of the file system to the free space.

The electronic device according to various embodiments may further include a communication circuit, and the processor may be further configured to control the electronic device to, in response to receiving data from an external device through the communication circuit at a transfer rate higher than a predetermined value, start to control the memory to perform the data storage through the fast data storage mode.

The electronic device according to various embodiments may further include a connecting terminal, and the processor may be further configured to control the electronic device to detect connection of an external device through the connecting terminal, and to, in response to receiving data from the external device at a transfer rate higher than a predetermined value, start to control the memory to perform the data storage through the fast data storage mode.

According to various example embodiments of the disclosure, a method for utilizing a memory space of an electronic device may include receiving an input, e.g., a user input, for inputting a setting value for a fast data storage mode of a memory; allocating a predetermined size of a free space of a file system of the electronic device as a temporary memory space for the fast data storage mode, based on the setting value for the fast data storage mode; allocating a predetermined size of a first space of the memory storing no data as a borrowed space for the fast data storage mode in correspondence with the size of the temporary memory space; recognizing occurrence of an event for starting data storage through the fast data storage mode; and performing the data storage using the borrowed space through the fast data storage mode at the memory in response to the occurrence of the event.

In the memory space utilizing method of the electronic device, the setting value for the fast data storage mode may include information about a size of the borrowed space to be used for performing the fast data storage mode and information about whether the fast data storage mode is used.

The memory space utilizing method of the electronic device may further include, in response to allocation of the temporary memory space, displaying through a display a size of the free space of the file system as being reduced by the size of the temporary memory space, or generating a file having the size of the temporary memory space to display the size of the free space of the file system as being reduced.

In the memory space utilizing method of the electronic device, the recognizing may include identifying at least one value of the number and amount of write input/output (I/O) requests that are generated to store data in the memory and are to be delivered to the memory; and starting the data storage through the fast data storage mode when the identified value is equal to or greater than a first threshold.

The memory space utilizing method of the electronic device may further include, based on the starting, periodically identifying the at least one value; and terminating the data storage through the fast data storage mode when the identified value is equal to or smaller than a second threshold.

The memory space utilizing method of the electronic device may further include, in response to occurrence of a write input/output (I/O) request for storing additional data beyond the borrowed space while performing the data storage through the fast data storage mode, performing additional data storage within a space size limit except for the borrowed space in the first space of the memory.

The memory space utilizing method of the electronic device may further include receiving, from the memory, information about a space size currently used to perform the data storage through the fast data storage mode in the borrowed space; and adjusting the size of the temporary memory space based on the received information.

The memory space utilizing method of the electronic device may further include, after performing the data storage, receiving a user input for releasing setting for the fast data storage mode of the memory; enabling the memory to store again data, temporarily stored in the borrowed space of the memory, in a space other than the borrowed space of the first space of the memory and delete the data temporarily stored in the borrowed space; and returning the temporary memory space of the file system to the free space.

In the memory space utilizing method of the electronic device, the recognizing may include, in response to receiving data from an external device through a communication circuit at a transfer rate higher than a predetermined value, starting the data storage through the fast data storage mode.

In the memory space utilizing method of the electronic device, the recognizing may include detecting connection of an external device through a connecting terminal; and in response to receiving data from the external device at a transfer rate higher than a predetermined value, starting the data storage through the fast data storage mode.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various example embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded (e.g., bought and/or sold) as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments thereof, it will be understood by those skilled in the art that various changes in form and details may be made therein without departing from the scope of the subject matter, including the appended claims.

What is claimed is:

1. An electronic device comprising:
   a storage including a storage device controller, a storage interface and a universal flash storage (UFS) memory, wherein the UFS memory including a buffer space in which 1-bit data is storable in per memory cell of the UFS memory when the storage operates in a high speed data storage mode, and a storage space in which n-bits data is storable in per memory cell of the UFS memory when the storage operates in a normal data storage mode,
   a processor configured to control the storage, and
   an internal memory operationally connected to the processor and configured to store instructions that, when executed by the processor, are configured to cause the processor to:
   identify size of data corresponding to data input/output (I/O) requests to be transmitted to the storage, determine whether to activate the high speed data storage mode of the storage based on the identified size of the data corresponding to data input/output (I/O) requests, based on determining to activate the high speed data storage mode of the storage, transmit information associated with activation of the high speed data storage mode to the storage, and control to transmit the data input/output (I/O) requests to the storage so that the storage can write the data corresponding to the data input/output (I/O) requests in the buffer space of the UFS memory using the high speed data storage mode.

2. The electronic device of claim 1, wherein the instructions further comprise an instruction that causes the processor to:

determine activation of the high speed data storage mode of the storage based on the identified size of data corresponding to data input/output (I/O) requests being equal to or greater than a first threshold, and determine deactivation of the high speed data storage mode of the storage based on the identified size of data corresponding to data input/output (I/O) requests being less than the first threshold.

3. The electronic device of claim 1, wherein the storage is further configured to, based on the data input/output (I/O) requests, write the data corresponding to the data input/output (I/O) requests to the buffer space in the high-speed data storage mode.

4. The electronic device of claim 3, wherein the storage device controller of the storage is further configured to write the data stored in the buffer space to the storage space when no data I/O request is received from the processor for a specific time.

5. The electronic device of claim 4, wherein the data stored in the buffer space is deleted in the buffer space based on writes to the storage space.

6. The electronic device of claim 1, wherein the instructions further comprise an instruction that causes the processor to:

identify size of data corresponding to data input/output (I/O) requests to be transmitted to the storage in the high-speed data storage mode, determine whether to deactivate the high speed data storage mode of the storage based on the identified size of data corresponding to data input/output (I/O) requests, and based on determining to deactivate the high speed data storage mode of the storage, transmit information associated with deactivation of the high speed data storage mode to the storage.

7. The electronic device of claim 6, wherein the instructions further comprise an instruction that causes the processor to:

determine activation of the high speed data storage mode of the storage based on the identified size of data corresponding to data input/output (I/O) requests being equal to or greater than a second threshold, and determine deactivation of the high speed data storage mode of the storage based on the identified size of data corresponding to data input/output (I/O) requests being less than the second threshold.

8. The electronic device of claim 6, wherein the storage device controller of the storage is further configured to write data to the storage space based on the reception of the information associated with the deactivation of the high speed data storage mode.

9. The electronic device of claim 1, wherein the buffer space and the storage space are different logical portions of a same UFS memory.

10. The electronic device of claim 1, wherein the instructions further comprise an instruction that causes the processor to:

identify a size of the buffer space based on the identified size of the data corresponding to data input/output (I/O) requests, and control the storage to allocate the buffer space corresponding to the identified size of the buffer space.

11. A method of an electronic device including a processor and a storage, the storage including a storage device controller, a storage interface and a universal flash storage (UFS) memory, the UFS memory including a buffer space in which 1-bit data is storable in per memory cell of the UFS memory while the storage is operating in a high speed data storage mode, and a storage space in which n-bits data is storable in per memory cell of the UFS memory while the storage is operating in a normal data storage mode, the method comprising:

identifying, by the processor, size of data corresponding to data input/output (I/O) requests to be transmitted to the storage, determining, by the processor, whether to activate the high speed data storage mode of a storage of the electronic device based on the identified size of the data corresponding to data input/output (I/O) requests, based on determining to activate the high speed data storage mode of the storage, transmit, by the processor, information associated with activation of the high speed data storage mode to the storage, and transmitting the data input/output (I/O) requests to the storage so that the storage writes the data corresponding to the data input/output (I/O) requests in the buffer space of the UFS memory using the high speed data storage mode.

12. The method of claim 11, wherein the determining whether to activate a high speed data storage mode of the storage of the electronic device comprises:

determining, by the processor, activation of the high speed data storage mode of the storage based on the identified size of data corresponding to data input/output (I/O) requests being equal to or greater than a first threshold, and determining, by the processor, deactivation of the high speed data storage mode of the storage based on the identified size of data corresponding to data input/output (I/O) requests being less than the first threshold.

13. The method of claim 11, further comprising;

writing, by the storage, the data corresponding to the data input/output (I/O) requests to the buffer space in the high-speed data storage mode based on the data input/output (I/O) requests.

14. The method of claim 13, further comprising;

writing, by the storage, the data stored in the buffer space to the storage space when no data I/O request is received from the processor for a specific time.

15. The method of claim 14, wherein the data stored in the buffer space is deleted in the buffer space based on writes to the storage space.

16. The method of claim 11, further comprising;

identifying, by the processor, size of data corresponding to data input/output (I/O) requests to be transmitted to the storage in the high-speed data storage mode, determining, by the processor, whether to deactivate the high speed data storage mode of the storage based on the identified size of data corresponding to data input/output (I/O) requests, based on determining to deactivate the high speed data storage mode of the storage, transmitting, by the processor, information associated with deactivation of the high speed data storage mode to the storage, and deactivating, by the storage, the high speed data storage mode.

17. The method of claim 16, wherein the identifying whether to activate the high speed data storage mode of the storage comprising;

determining, by the processor, activation of the high speed data storage mode of the storage based on the identified size of data corresponding to data input/output (I/O) requests being equal to or greater than a second threshold, and determining, by the processor, deactivation of the high speed data storage mode of the storage based on the identified size of data corresponding to data input/output (I/O) requests being less than the second threshold.

18. The method of claim 16, further comprising;

writing, by the storage, the data stored in the buffer space to the storage space based on identifying that to deactivate the high speed data storage mode of the storage.

19. The method of claim 11, wherein the buffer space and the storage space are different logical portions of a same UFS memory.

20. The method of claim 11, further comprising;

identifying a size of the buffer space based on the identified size of the data corresponding to data input/output (I/O) requests, and controlling the storage to allocate the buffer space corresponding to the identified size of the buffer space.

* * * * *